(12) United States Patent
Murray et al.

(10) Patent No.: US 8,596,523 B2
(45) Date of Patent: Dec. 3, 2013

(54) INDEX PRINT WITH MACHINE-READABLE CODES

(75) Inventors: Thomas Joseph Murray, Cohocton, NY (US); Thiagarajah Arujunan, Penfield, NY (US); Ronald Steven Cok, Rochester, NY (US); Mark P. Hinman, Holly, NY (US)

(73) Assignee: Intellectual Ventures Fund 83 LLC, Las Vegas, NV (US)

( * ) Notice: Subject to any disclaimer, the term of this patent is extended or adjusted under 35 U.S.C. 154(b) by 83 days.

(21) Appl. No.: 13/192,514

(22) Filed: Jul. 28, 2011

(65) Prior Publication Data

US 2013/0026222 A1 Jan. 31, 2013

(51) Int. Cl.
*G06F 17/00* (2006.01)

(52) U.S. Cl.
USPC ............... 235/375; 235/462.12; 235/462.15; 705/16; 358/1.14

(58) Field of Classification Search
USPC ................. 235/375, 462.12, 462.15; 705/16; 358/1.14
See application file for complete search history.

(56) References Cited

U.S. PATENT DOCUMENTS

| | | | |
|---|---|---|---|
| 5,905,580 A | 5/1999 | Cok et al. | |
| 6,199,048 B1 | 3/2001 | Hudetz et al. | |
| 6,229,964 B1 | 5/2001 | Bell | |
| 6,434,579 B1 | 8/2002 | Shaffer et al. | |
| 6,623,528 B1* | 9/2003 | Squilla et al. | 715/202 |
| 6,690,843 B1 | 2/2004 | Squilla et al. | |
| 6,760,884 B1* | 7/2004 | Vertelney et al. | 715/202 |
| 7,123,782 B2 | 10/2006 | Shih et al. | |
| 7,273,175 B2 | 9/2007 | Zhao et al. | |
| 7,546,528 B2 | 6/2009 | Barrus et al. | |
| 7,703,121 B2 | 4/2010 | Vau et al. | |
| 7,757,162 B2 | 7/2010 | Barrus et al. | |
| 7,835,037 B2 | 11/2010 | Koide | |
| 7,841,531 B2 | 11/2010 | Onogi | |
| 2004/0096123 A1 | 5/2004 | Shih et al. | |
| 2005/0211780 A1* | 9/2005 | Tanaka | 235/462.15 |
| 2005/0229107 A1* | 10/2005 | Hull et al. | 715/764 |
| 2006/0147083 A1 | 7/2006 | Piersol | |
| 2008/0062457 A1* | 3/2008 | Yoshitani | 358/1.15 |
| 2009/0078772 A1 | 3/2009 | Ofek et al. | |
| 2009/0212112 A1* | 8/2009 | Li et al. | 235/462.12 |
| 2010/0128297 A1* | 5/2010 | Redd et al. | 358/1.13 |
| 2011/0085193 A1* | 4/2011 | Sato | 358/1.13 |
| 2012/0173347 A1* | 7/2012 | De Almeida Neves et al. | 705/16 |
| 2012/0274970 A1* | 11/2012 | Cok | 358/1.14 |

* cited by examiner

*Primary Examiner* — Allyson Trail

(57) ABSTRACT

A viewable image for selecting one or more digital images from a collection of digital images includes a plurality of representative images representing corresponding digital images in the collection, each corresponding digital image stored in an electronic storage and retrieval system and a plurality of machine-readable codes, each machine-readable code associated with one of the representative images so that a viewer can readily identify a desired digital image and a corresponding machine-readable code in the viewable image, wherein each machine-readable code can be photographed to select its corresponding digital image, and wherein the machine-readable code encodes a reference to the corresponding digital image stored in the electronic storage and retrieval system.

20 Claims, 20 Drawing Sheets

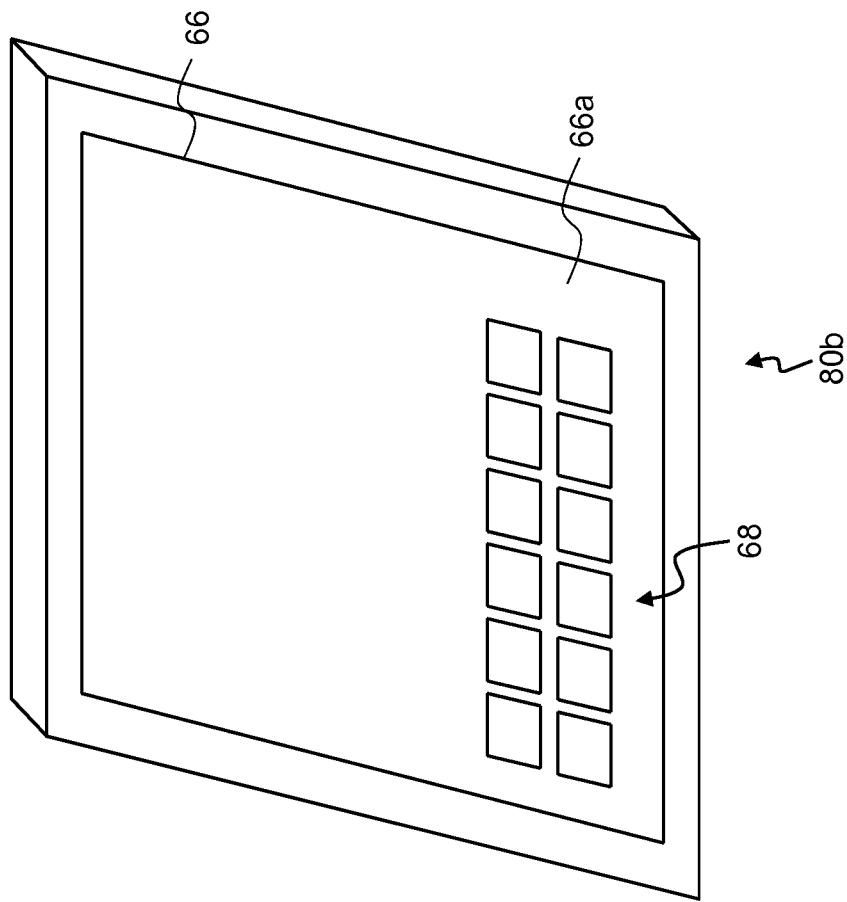
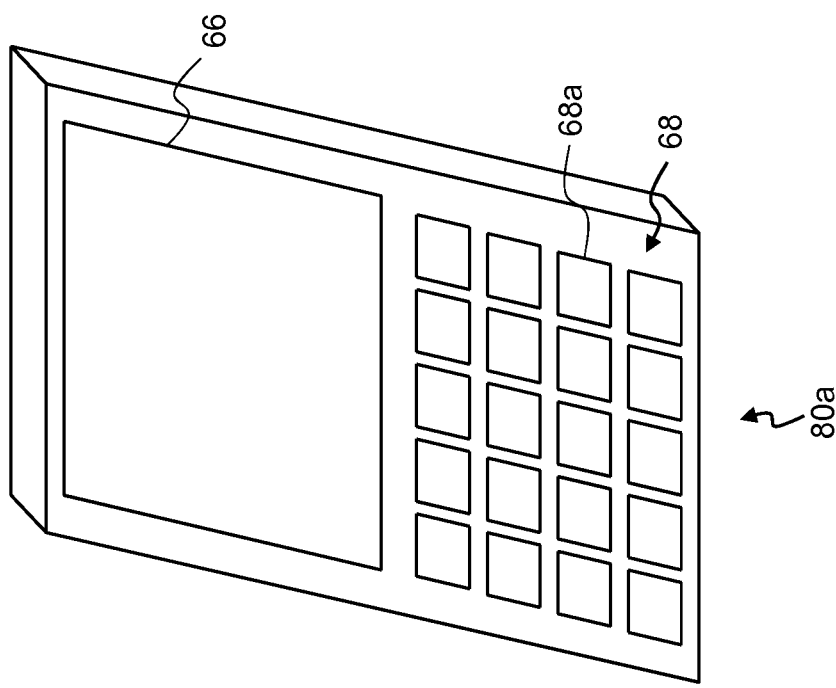
FIG. 8

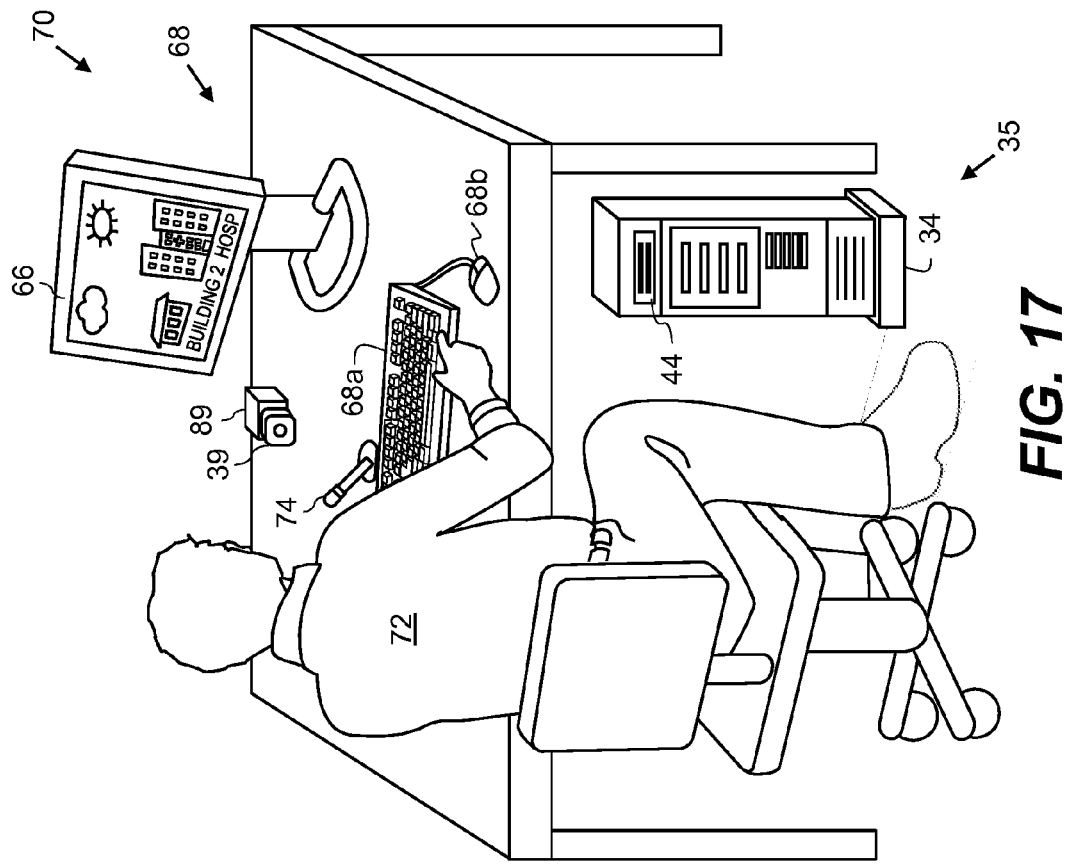
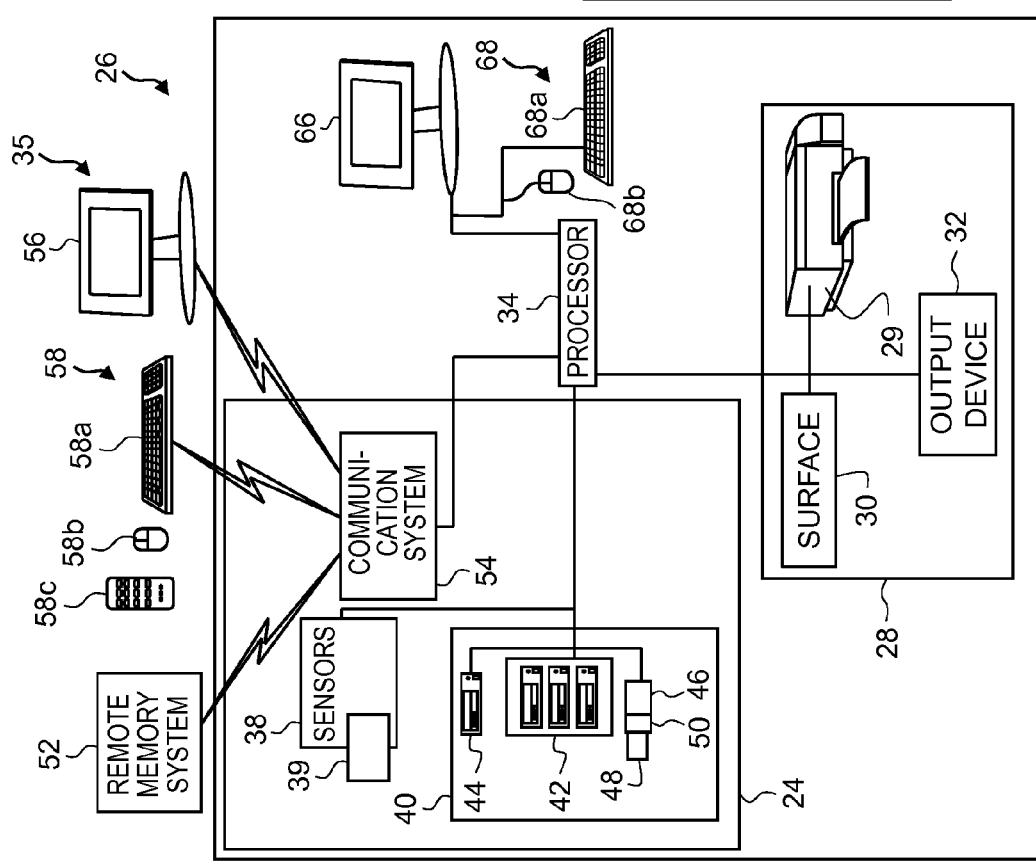

INDEX PRINT WITH MACHINE-READABLE CODES

CROSS REFERENCE TO RELATED APPLICATIONS

Reference is made to commonly-assigned, co-pending U.S. patent application Ser. No. 13/192,505 filed concurrently herewith, entitled IMAGE SELECTION METHOD USING MACHINE-READABLE CODES, by Murray et al., and U.S. patent application Ser. No. 13/192,516 filed concurrently herewith and entitled "SELECTING IMAGES USING MACHINE-READABLE CODES", by Murray et al., the disclosures of which are incorporated herein.

Reference is made to commonly-assigned U.S. patent application Ser. No. 13/113,120, filed May 23, 2011, entitled "IMAGE-EMBEDDED VISIBLE MACHINE-READABLE OPTICAL CODES" by Ronald S. Cok, et al., the disclosure of which is incorporated herein.

FIELD OF THE INVENTION

The present invention relates to machine-readable codes and, more particularly, to the use of machine-readable optical codes with index prints.

BACKGROUND OF THE INVENTION

Machine-readable codes have been in use for many years. Such codes are often implemented as optical codes that are read by capturing the reflection of electromagnetic radiation from the code. The ubiquitous one-dimensional barcode is used for product tracking and to automate purchases. For example, one-dimensional barcodes are in widespread use for managing point-of-sale purchase transactions using computer-controlled laser scanners.

More recently, two-dimensional codes, also known as matrix barcodes, such as QR ("Quick Response") codes, have become popular. Two-dimensional codes can encode a much greater quantity of information than one-dimensional codes. The information encoded in such codes is readily accessed through digital photographs of the codes that are processed by application software found in computers and mobile communication devices such as cell phones having digital signal processing and internet communication access. QR codes are frequently employed in conjunction with product advertising to provide an interne URI website link with information about the product advertised.

Optical bar codes are typically intended to be visually observable by humans, so that humans can find the codes and take appropriate action to access encoded information or otherwise use the codes. In contrast, steganographic information is designed to be hidden within an image. The present invention addresses optical codes that are intended to be observable to humans and does not address steganographic codes. Referring to FIG. 20, a matrix barcode 1 of the prior art is illustrated with dark and light elements forming black modules on a white background. As used herein, the term matrix barcode is used synonymously with two-dimensional optical code. A QR code is an example of a matrix barcode. Such codes are machine-readable and are input by a machine (such as a scanner or digital imager), analyzed with image processing equipment and software, and the information encoded in the code decoded, extracted, and used.

The formation, printing, scanning, and decoding of one- and two-dimensional bar codes is known in the art. For example, U.S. Pat. No. 7,273,175 describes a method, apparatus and a storage medium for locating QR codes. An image processing apparatus including an optical reader and image processing hardware is discussed in U.S. Pat. No. 7,835,037. U.S. Pat. No. 7,841,531 discloses a camera operating system and matrix decoding device. U.S. Patent Application Publication 20090078772 describes techniques for decoding images of barcodes. U.S. Pat. No. 6,229,964 addresses an icon reader that reads picture identification data from a data icon on an image print. U.S. Pat. No. 7,123,782 describes using a code printed in association with a printed image to identify an electronic repository for a digital version of the printed image.

Codes on an image print can include a reference to remotely-stored information. A code reader can scan the code, decode the reference, and retrieve the information. For example, U.S. Pat. No. 6,199,048 describes a system and method for using identification codes found on ordinary articles of commerce to access remote computers on a network. In accordance with one embodiment of the invention, a computer is provided having a database that relates Uniform Product Code ("UPC") numbers to Internet network addresses (or "URLs"). To access an Internet resource relating to a particular product, a user enters the product's UPC symbol manually, by swiping a bar code reader over the UPC symbol, or via other suitable input means. The database retrieves the URL corresponding to the UPC code. This location information is then used to access the desired resource.

U.S. Patent Application Publication 20040096123A1 discloses a method and system for locating and accessing digitally stored images including a hard copy print, method and system for producing the hard copy print. The hard copy print has a print side and a back side. The print side has information thereon which identifies the electronic location at which a digital record of the image is accessed electronically. This information is preferably written in a machine readable form so as to allow automatic accessing of the digitally stored images. The system includes a digital storage device for storing of a digital record file of the image on the hard copy print.

Images require large amounts of space, both for storage and for display. A small printed image can require fifteen square inches of photographic paper, while large prints can be as large as a poster. Similarly, electronically displayed images require large amounts of space on a display, such as a computer monitor or television. Collections of images are therefore difficult to review. One approach to reviewing image collections is the use of index prints, small thumbnail prints of images in a collection that are provided on a paper substrate (e.g. an index print) or on an electronic display, for example as taught in U.S. Pat. No. 5,905,580.

U.S. Pat. No. 6,623,528 describes a method for constructing a photo album that includes generating an index print of thumbnails and a machine-readable means for selecting one or more of the images, selecting desired thumbnails, reading the selected thumbnails with a scanner, and constructing a photo album from the images corresponding to the selected thumbnails. In this case, users physically mark the index print to select the desired images; physical delivery of the index sheet is required, as is a scanner. Similarly, it is known to print optical codes on a sheet that reference product information, for example information relevant to a product or that enable a product purchase. U.S. Pat. No. 6,690,843 and U.S. Pat. No. 6,434,579 describe a method for constructing a photo album or photo collage that employs stickers imprinted with thumbnail images having steganographically encoded data adhered to a specification sheet. The specification sheet can include machine-readable codes. However, the specification sheet must be physically delivered or electronically transmitted as an image (e.g. with a facsimile machine) and the thumbnail images processed to retrieve the encoded data. Stamp sheets are described in U.S. Pat. No. 7,546,528 that include machine-readable pointers, but do not enable the selection of items in an index print. U.S. Pat. No. 7,757,162 and U.S. Patent Application 20060147083 disclose document collections but also fail to enable the selection of items in an index print.

U.S. Pat. No. 7,703,121 describes a method of distributing multi-media data to equipment provided with an image sensor. The data can include images. However, this method requires complex and difficult image comparison and searching.

There remains a need, therefore, for an alternative system and method for selecting desired images from a collection of images that provides improved efficiency, reduced handling of physical media, and reduced equipment needs.

SUMMARY OF THE INVENTION

In accordance with the present invention, there is provided a viewable image enabling selection of one or more digital images from a collection of digital images, comprising:

a plurality of representative images representing corresponding digital images in the collection, each corresponding digital image stored at a storage location in an electronic storage and retrieval system; and a plurality of machine-readable codes, each machine-readable code associated with one of the representative images so that a viewer can readily identify a desired digital image and a corresponding machine-readable code in the viewable image, wherein:

a) each machine-readable code is photographed to select its corresponding digital image; and b) the machine-readable code encodes a reference to the storage location of the corresponding digital image in the electronic storage and retrieval system.

The present invention provides a viewable image for selecting images in a collection to form a desired collection. The invention is particularly suited for users employing an electronic capture device with a limited display capability. For example, a mobile cellular telephone can incorporate a digital camera to take a large collection of images that require large display areas, such as digital images. Use of the present invention provides a simple, intuitive way to specify collections of desired images without the use of a separate computer or device with a large display.

These, and other, attributes of the present invention will be better appreciated and understood when considered in conjunction with the following description and the accompanying drawings. It should be understood, however, that the following description, although indicating embodiments of the present invention and numerous specific details thereof, is given by way of illustration and not of limitation. Many of the elements described as related to a particular embodiment can be used together with, and possibly interchanged with, elements of other described embodiments. The figures below are not intended to be drawn to any precise scale with respect to relative size, angular relationship, or relative position or to any combinational relationship with respect to interchangeability, substitution, or representation of an actual implementation.

BRIEF DESCRIPTION OF THE DRAWINGS

The above and other features and advantages of the present invention will become more apparent when taken in conjunction with the following description and drawings wherein identical reference numerals have been used to designate identical features that are common to the figures, and wherein:

FIG. 8 is an illustration of mobile communication devices useful with the present invention;

FIG. 16 is an illustration of an embodiment of a computer system useful in various embodiments of the present invention;

FIG. 17 is an illustration of an embodiment of a desktop computer, work station, or kiosk that can be used in a system of FIG. 16;

DETAILED DESCRIPTION OF THE INVENTION

Figure 1:
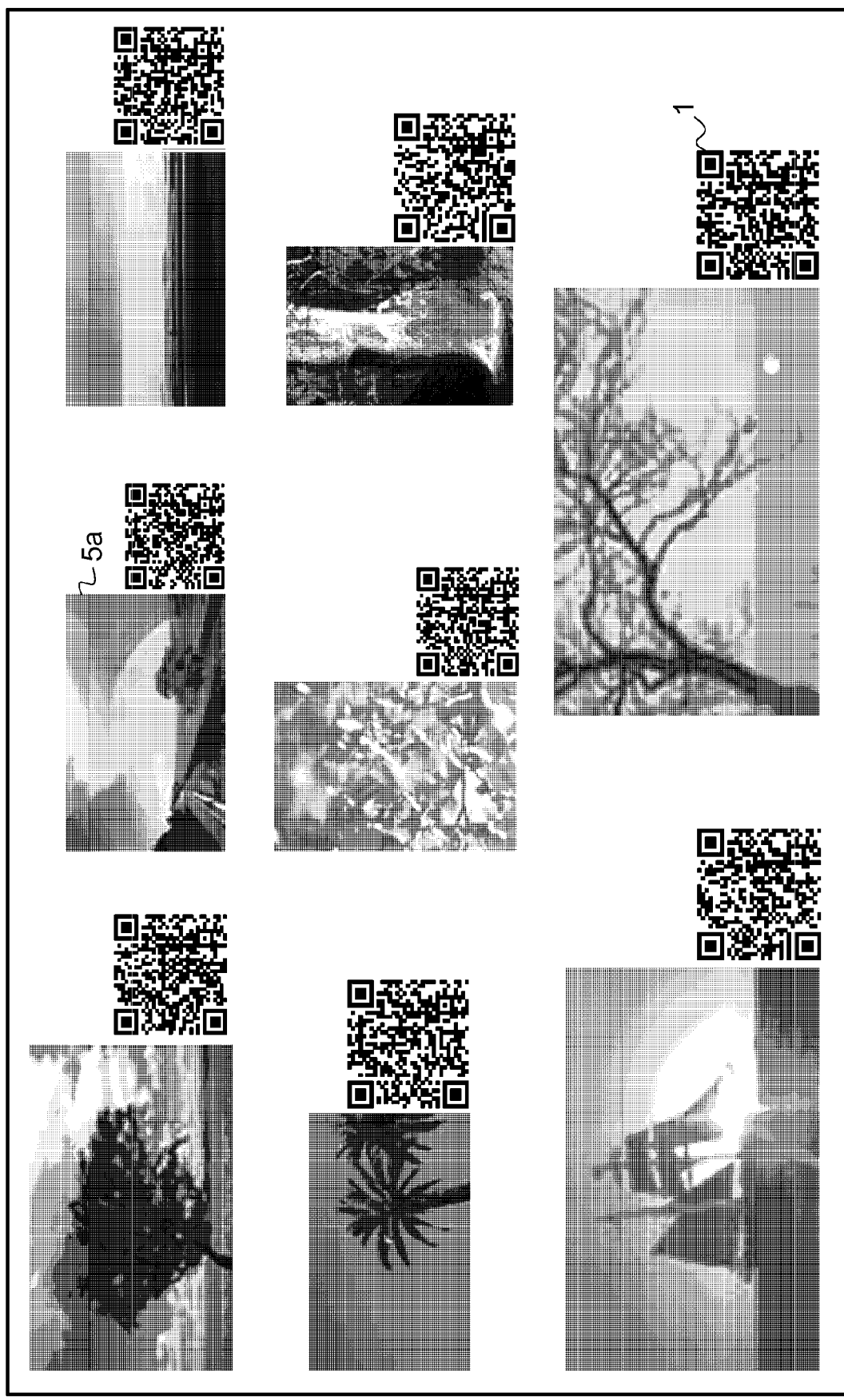
FIG. 1 is an illustration of a viewable image having digital images and machine-readable codes according to an embodiment of the present invention.

Referring to FIGS. 1, 5, 6, and 10, according to an embodiment of the present invention, a method of selecting digital images 5 from a first collection of digital images 5 to specify a second collection of digital images 5 comprises the steps of using a processor 34 to store each digital image 5 in the first collection of digital images 5 in an electronic storage and retrieval system 16 in step 150. A processor 34 is used to form a corresponding machine-readable code 1 for each stored digital image 5 in step 155, the machine-readable code 1 encoding a reference to the storage location of the corresponding digital image 5 in the electronic storage and retrieval system 16. A processor 34 is used to provide a viewable image 8 (for example with a printer 29 to print an index print on a substrate) that includes a representative image 5a for each digital image 5 in the first collection of digital images 5 in association with its corresponding machine-readable code 1 in step 160. A processor 34 is used in step 165 to select one or more but not all of the digital images 5 from the viewable image 8 by receiving references (step 166) or photographs of the machine-readable codes 1 (step 167) and extracting the references from the received photographs (step 168) and compiling the digital images 5 corresponding to the received or extracted references into the second image collection in step 170. One or more of the compiled images in the second image collection can be displayed in step 175, for example by using a processor and a computer-controlled display. Digital images 5 are compiled by associating the digital images or references to the digital images into a group such as the second image collection.

The representative images 5a in the viewable image 8 can be smaller printed or displayed representations of corresponding larger digital images 5 stored in the electronic storage and retrieval system 16. Smaller representations of corresponding larger digital images are often called "thumbnail" images. The digital images 5 stored in the electronic storage and retrieval system 16 are not necessarily distinguished from a thumbnail representation of the digital image 5, since both are fundamentally images representing the same information. In an embodiment, a stored digital image 5 is larger and has higher resolution than a displayed or printed thumbnail representative image 5a of the same digital image 5. In another embodiment, a stored digital image 5 is not larger and does not have higher resolution than a displayed or printed thumbnail image 5a representing the digital image 5. As used herein, the representative image 5a of a corresponding stored digital image 5 is the image included as part of the viewable image 8 that represents the corresponding digital image 5. Generally, the representative image 5a appears similar to the stored digital image 5; although in some embodiments the representative image 5a can be a smaller, lower resolution, or black and white version of the stored digital image 5. The representative image 5a corresponds to the stored digital image 5 and is associated in the viewable image 8 with a machine-readable code 1 encoding a reference to the digital image 5. The machine-readable code 1 associated with a representative image 5a corresponds to the same digital image 5 to which the representative image 5a corresponds. A reference is information specifying the location of a digital image 5 in the electronic storage and retrieval system 16, for example an address, a location indicator, or a universal resource indicator (URI) or locator (URL). A machine-readable code 1 is associated with a representative image 5a when both relate to the same digital image 5 and the relationship is indicated to a viewer of the viewable image 8.

Figure 9:
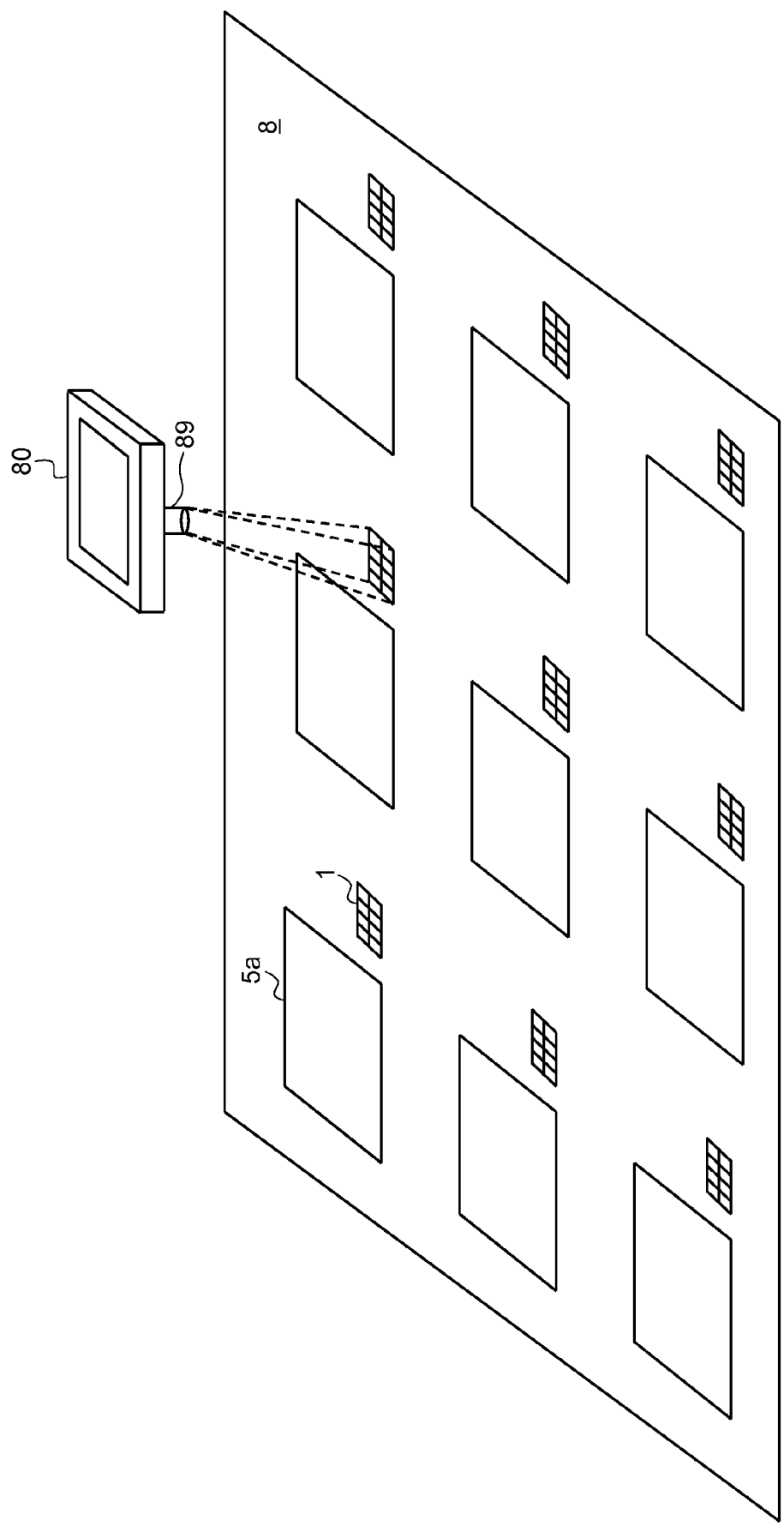
FIG. 9 is a schematic of a mobile communication device photographing a viewable image according to a method of the present invention.
Figure 10:
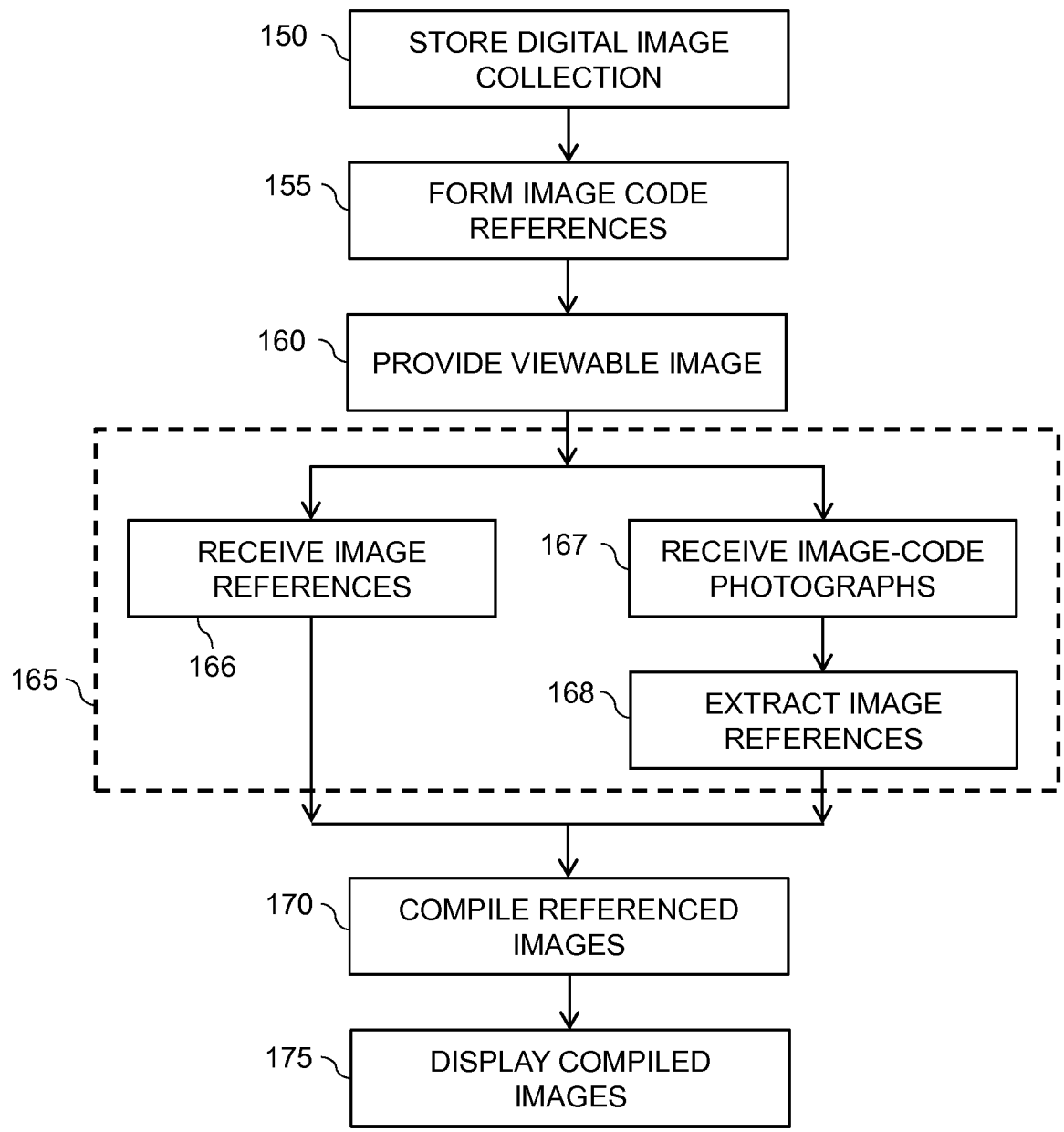
FIGS. 10-14 are flow diagrams illustrating various methods of the present invention.

The machine-readable codes 1 are viewable and printed or displayed as part of the viewable image 8. Each machine-readable code 1 encodes a reference to the storage location of a corresponding digital image 5 in the electronic storage and retrieval system 16. A photograph of the machine-readable code 1 is a photograph made of a portion of the viewable image 8 that includes the machine-readable code 1, for example by using a mobile communication device 80 having a digital camera 89 as shown in FIG. 9. The photograph can be a digital image. The reference can be decoded from a photograph of the machine-readable code 1 using image processing software and algorithms known in the art.

The viewable image 8 can be an index print. As used herein, an index print is a group or collection of representative images printed on a substrate. An index print can be a printed collection of thumbnail representative images 5a representing corresponding digital images 5 stored elsewhere. A viewable image 8 in an embodiment of the present invention can include thumbnail representative images 5a representing larger corresponding digital images 5 stored in the electronic storage and retrieval system 16, the thumbnail images 5a provided in association with machine-readable codes 1 in the viewable image 8.

Figure 2A:
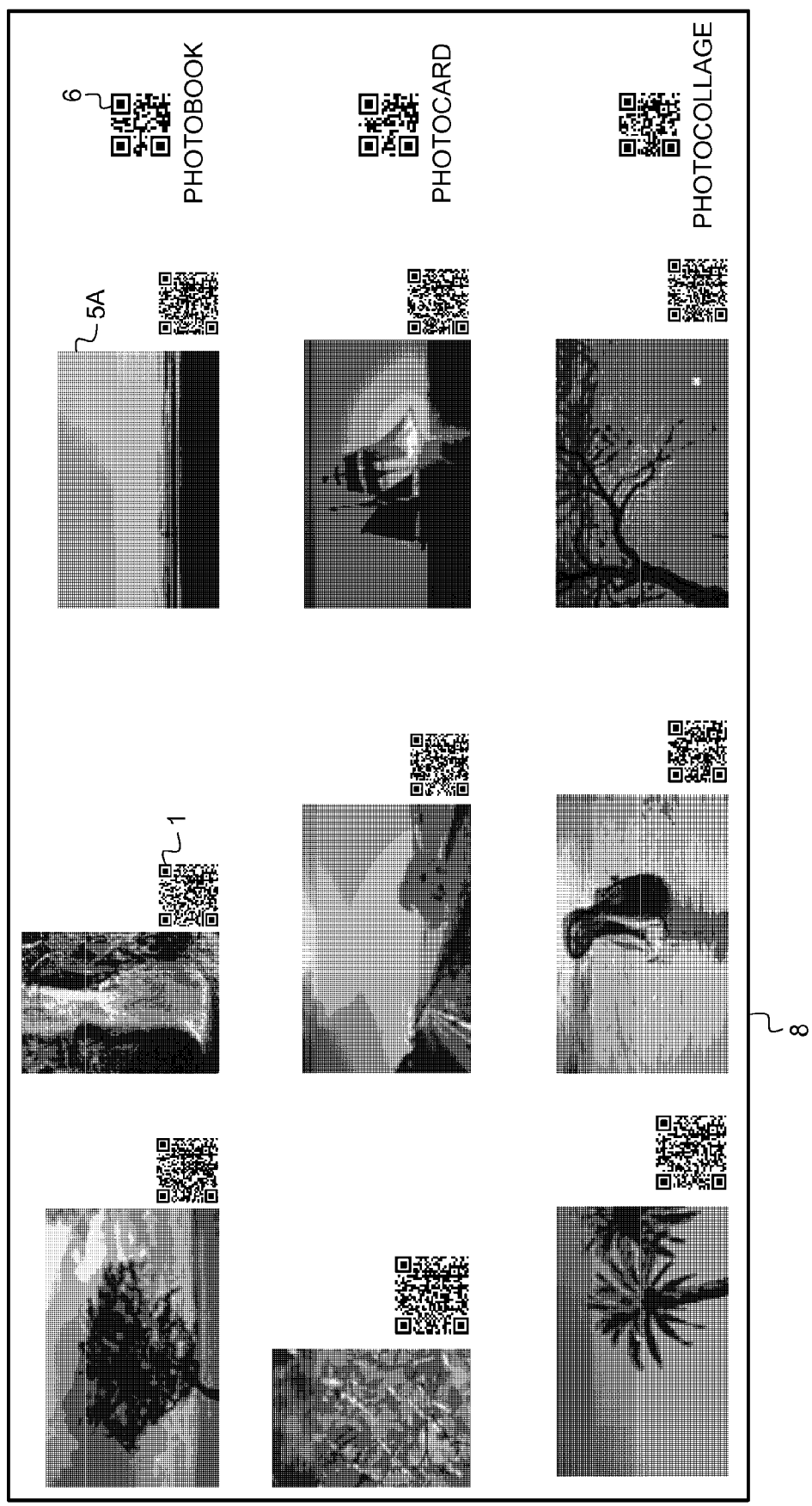
FIG. 2A is an illustration of a viewable image having digital images, machine-readable codes, and image-product codes according to another embodiment of the present invention.
Figure 2B:
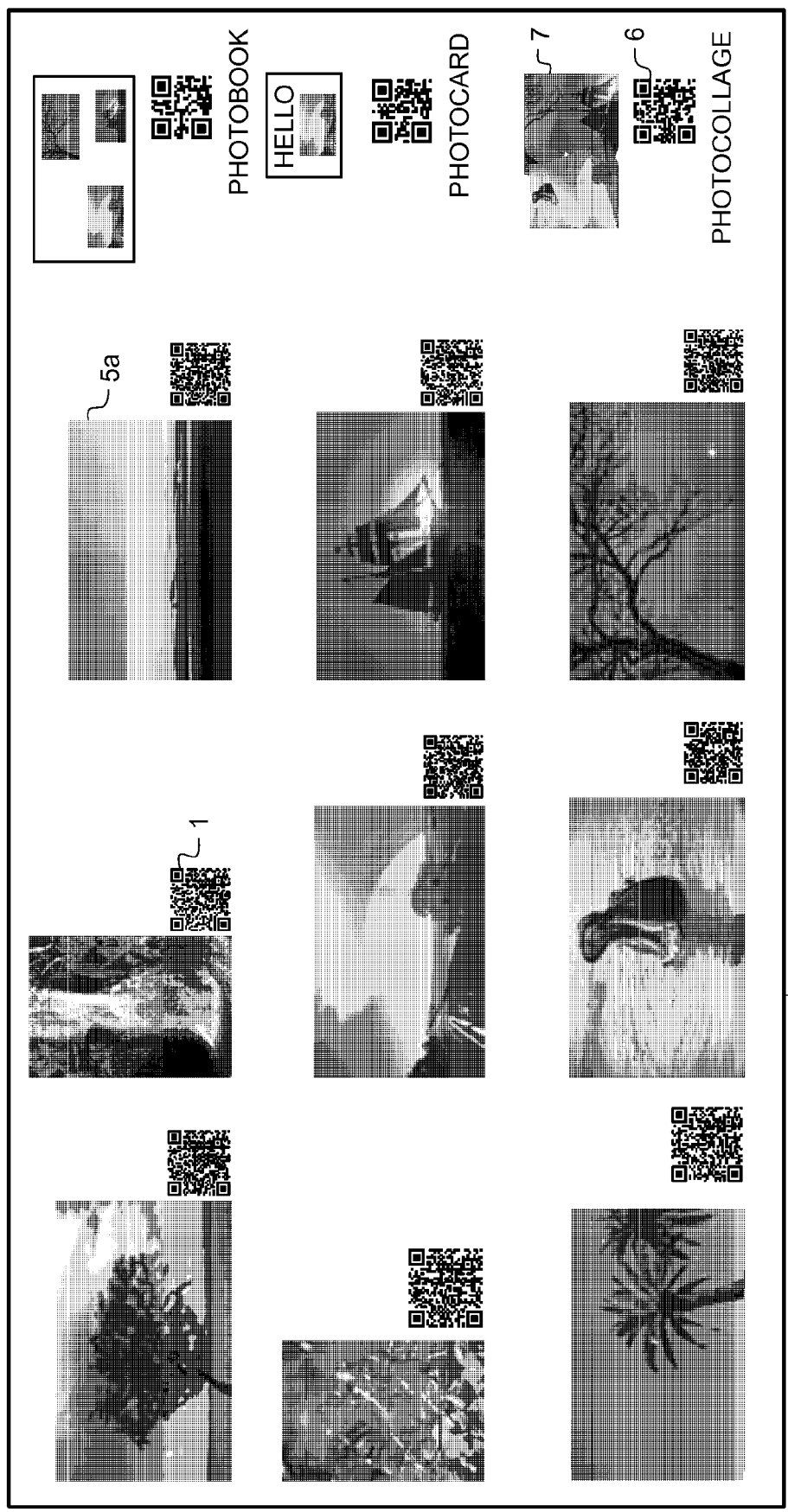
FIG. 2B is an illustration of a viewable image having digital images, machine-readable codes, image-product codes, and image product illustrations according to another embodiment of the present invention.
Figure 11:
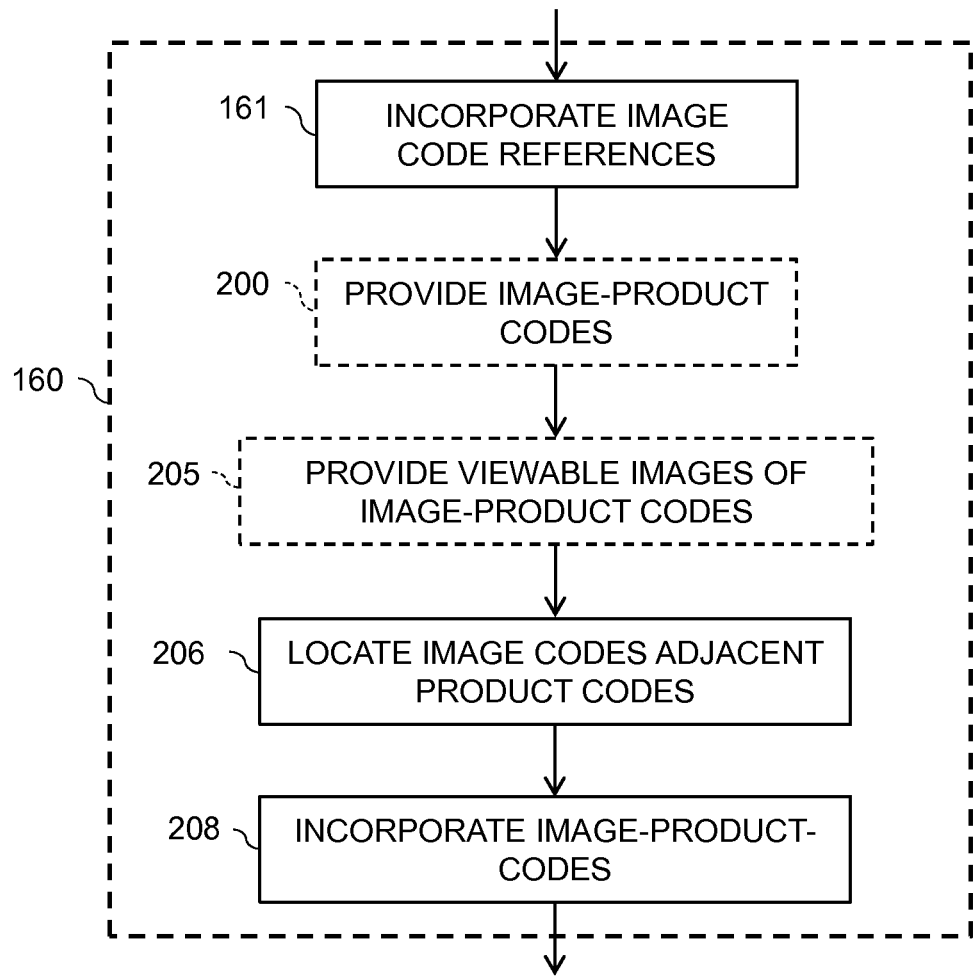

Referring to FIGS. 2A and 2B and 11, in a further embodiment of the present invention using one or more processors 34 (FIG. 6) and for example as a part of providing the viewable image 8 in step 160, image references are incorporated into the viewable image 8 in step 161 by way of the machine-readable codes 1. In optional steps, a product-specifying machine-readable code 6 referencing an image product (e.g. 14 in FIG. 22) is provided in step 200 and included in the viewable image 8 in step 205. An image product 14 can incorporate one or more of the digital images 5 (FIG. 6) in the second image collection. The product-specifying machine-readable codes 6 can be located adjacent to the image machine-readable codes 1 and digital images 5a, as shown in FIG. 2A, in step 206. Once located, the product-specifying machine-readable codes 6 can be incorporated into the viewable image 8 in step 208.

In one embodiment of the present invention as shown in FIGS. 1 and 2A, each machine-readable code 1 is located spatially adjacent to its associated representative image 5a in the viewable image 8 to indicate their relationship. In another embodiment shown in FIG. 3, an alphanumeric reference 9 common to both the machine-readable code 1, 6 and its associated representative image 5a is provided in the viewable image 8 to indicate their relationship.

In a further embodiment of the present invention and as shown in FIG. 2B, illustrations 7 of the image product 14 can be provided in the viewable image 8. The illustrations 7 of the image products 14 can include one or more of the digital images 5 in the first collection. The illustrations 7 of the image products 14 can be, for example images, descriptive information, or graphic elements. In the example embodiment of FIG. 2B, digital images 5 from the first collection are included in the image-product representations, for example in the photobook, photo-card, and photo-collage illustration 7.

Figure 12:
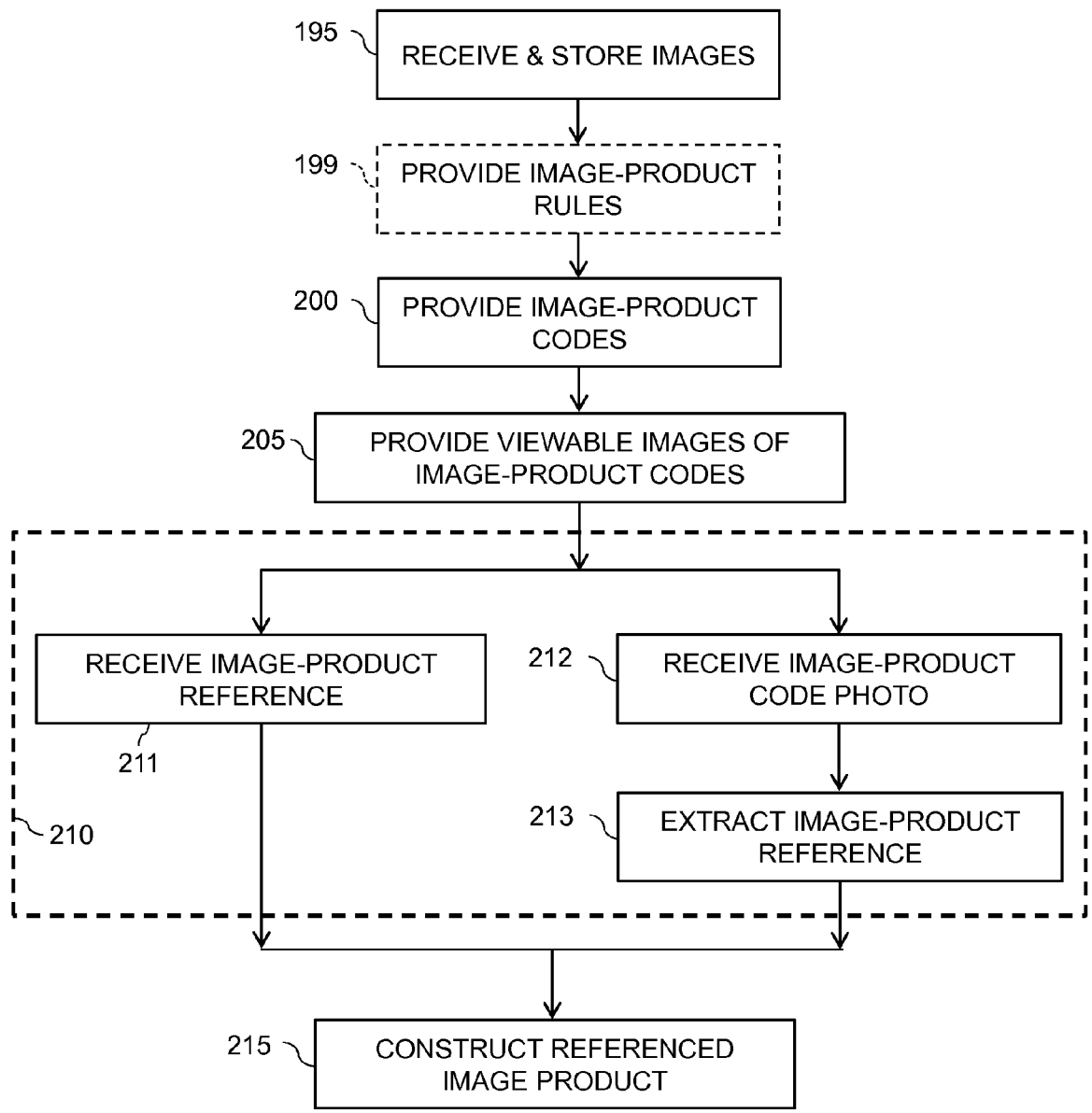

Once a viewable image 8 has been constructed that includes product-specifying machine readable codes 6 referencing image products, photographs of the product-specifying machine readable codes 6 can be received by a processor 34 and the image-product reference extracted or, alternatively, the image-product reference can be received. Referring to FIG. 12, in an embodiment of the present invention, digital images 5 are received and stored in step 195 in an electronic storage and retrieval system 16, image-product machine-readable codes 6 are provided in step 200 and the image-product machine-readable codes 6 are incorporated into the viewable image 8 in step 205. References to the image products 14 are then received (step 211) or photographs of the image-product codes 6 are received (step 212). In the latter case, the image-product references are extracted from the image-product machine-readable codes 6 (step 213).

Figure 13:
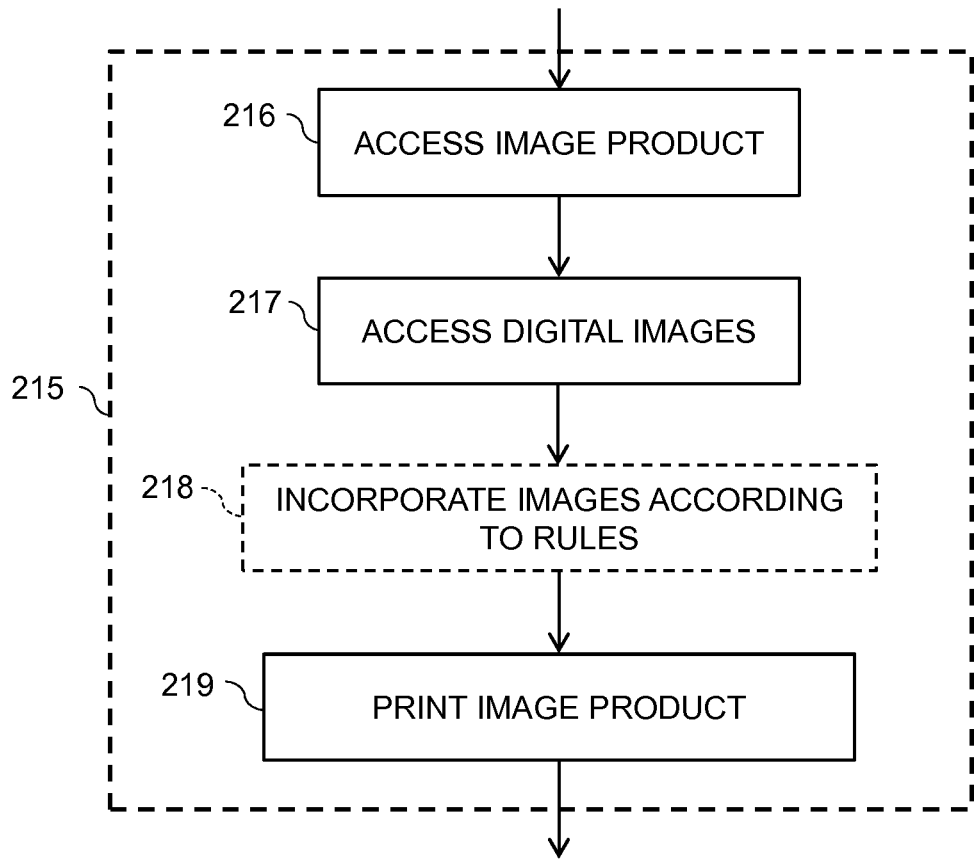
Figure 14:
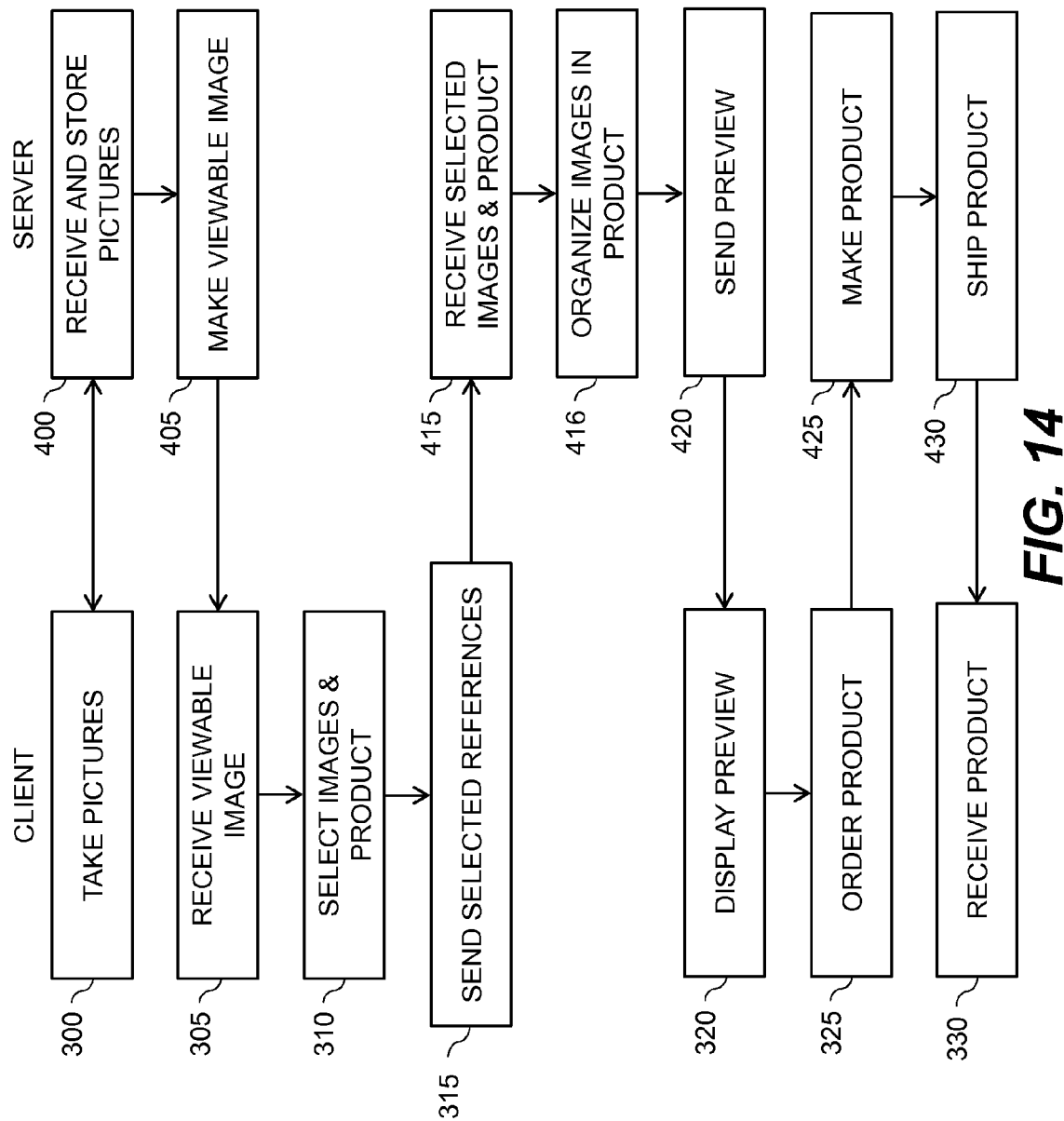

Once the image-product reference is known, the image product specification can be accessed and the image product 14 constructed (step 215). Referring in more detail to FIG. 13, representing the construction of the image product 14 (step 215), the referenced image product 14 can be accessed from an electronic storage system 16 in step 216, the digital images 5 needed for the image product 14 accessed in step 217 and the image product 14 made, for example by printing with a printer 29 (step 219). In an alternative embodiment, the image product 14 is an electronic product and the electronic product is electronically specified, assembled, and transmitted to a customer. Image products 14 can include photo-books, photo-cards, or photo-collages, either electronic or printed, or a combination of electronic and printed.

Figure 22:
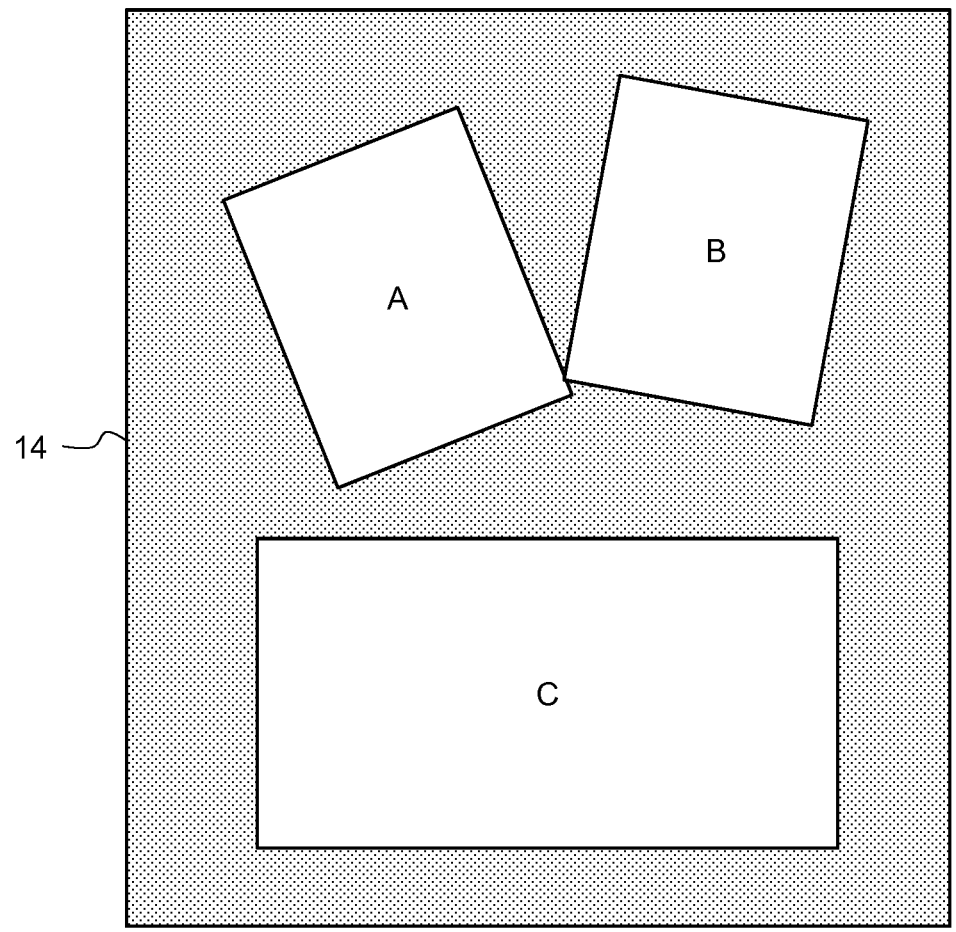
FIG. 22 is an illustration of an image product having image locations useful in understanding the present invention.

Referring to FIG. 22, image products 14 typically include image openings (A, B, C) at specified locations. According to further embodiments of the present invention, selected digital images 5 are located at the specified locations in accordance with rules (step 199 of FIG. 12). For example, rules can be provided that specify that the order in which photographs of machine-readable codes 1 associated with selected digital images 5 or references to the selected digital images 5 were received corresponds to an order of the specified locations and each selected digital image 5 is composited into its corresponding location. In another embodiment, rules can be provided that specify that the orientation of the selected digital images 5 corresponds to the aspect ratio of the specified location. Once the rules are specified, they can be applied, for example by an image processor 34, to incorporate the images into the image product locations according to the rules (step 218).

As shown in FIG. 22, it can be the case that an image product 14 includes more than one digital image 5 and that the digital images 5 are located in specific locations (A, B, C) in the image product 14. It is helpful, therefore, to associate selected digital images 5 with desired specific locations (e.g. A, B, C) in an image product 14, for example by employing a set of rules governing such association. This can be accomplished, in one embodiment of the present invention, by ordering the locations (A, B, C) in the image product 14 and matching the location order to a received order corresponding to the temporal order of the digital image selection for the second collection. For example, the digital image 5 corresponding to the first digital image reference or associated machine-readable code 1 received is located in the first image opening (e.g. A). The digital image 5 corresponding to the second digital image reference or associated machine-readable code 1 received is located in the second image opening (e.g. B). The digital image 5 corresponding to the third digital image reference or associated machine-readable code 1 received is located in the third image opening (e.g. C).

In another embodiment, rules can specify the association of image-product locations with the selected digital images 5 by matching the aspect ratio of the locations (A, B, C) with the aspect ratio of the selected digital images 5. As shown in FIG. 22, locations A and B are in a portrait format, while the location C has a landscape format. These openings (A, B, C) can be matched to selected digital images 5, for example, the leaves and waterfall picture of FIG. 1 are portrait images, while the remaining images are in landscape format. If the portrait images and one landscape image are selected, they can be matched to corresponding openings by employing the provided rule.

Figure 5:
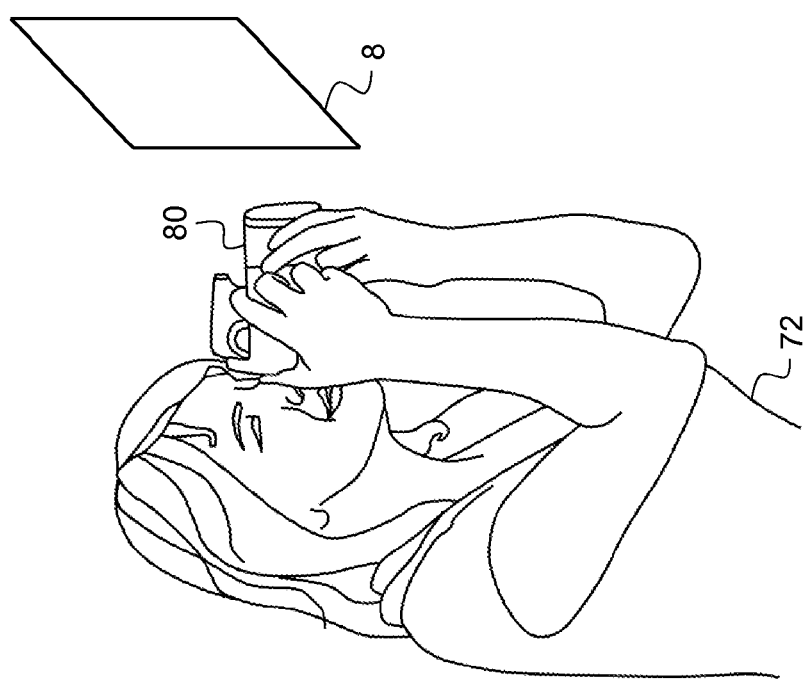
FIG. 5 is a schematic of a user photographing a viewable image according to a method of the present invention.

The capture, transmission, and storage of digital images are well known in the art. For example, as shown in FIGS. 5 and 9, a user 72 can use a mobile communication device 80 that incorporates a digital camera 89 to photograph machine-readable codes 1 in a viewable image 80 to select digital images 5a associated with the machine-readable codes 1 and image products, for example, by photographing the machine-readable codes 1 corresponding to desired digital images 5 and image product. The mobile communication device 80 can be located at a suitable distance from the viewable image 8 (as technically enabled by the digital camera 89 in the mobile communication device 80, for example using the optical lens system 85 shown in FIG. 7) for photographing a machine-readable code 1 in the viewable image 8. Suitable mobile communication devices 80 are known.

Figure 6:
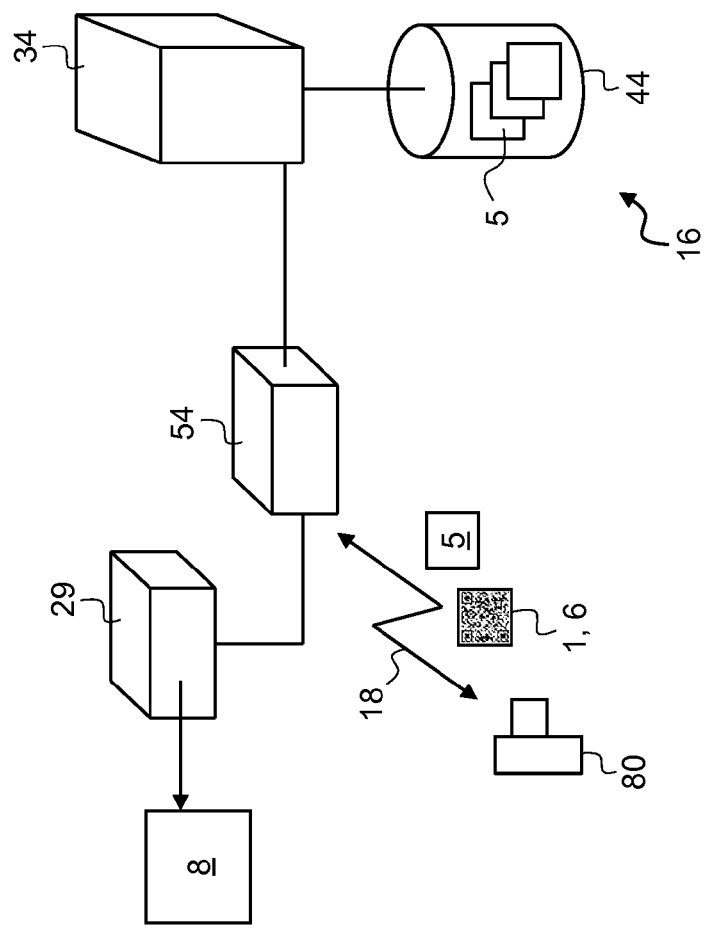
FIG. 6 is a schematic of a system useful with the present invention.

Likewise, as shown in FIG. 6, systems that communicate with mobile communication devices 80 through wireless (e.g. WiFi, Bluetooth) or wired (e.g. wired Ethernet, USB) communication channels 18 are known. A variety of systems can be used to implement the various methods of the present invention. Referring to FIG. 6, in one embodiment, such a system can include a communication system 54, processor 34 and electronic storage and retrieval system 16 (e.g. a disk drive 44) communicatively interconnected. Such computer system components are well known in the art. The processor 34 can be a single processor or can include multiple processors or distributed processors. All of the processing tasks can be done on a single processor or can be done using multiple, different processors. The system for selecting digital images 5 from a first collection of digital images 5 to specify a second collection of digital images 5 includes an electronic storage and retrieval system 16, a server processor 34 connected to one or more remote client computer(s) (e.g. mobile communication device 80) through a communication channel 18, the server processor 34 connected and having access to the electronic storage and retrieval system 16. The communication channel 18 can be a network and can interact with the processor 34 through a communication system 54.

The user 72 can photograph scenes and transmit the captured scenes through the communication channel 18 to the communication system 54 to be stored by the processor 34 on the disk drive 44 as a digital image 5, as is known. The captured digital images 5 stored in the electronic storage and retrieval system 16 can be represented, in an example, by thumbnail representative images 5a in the viewable image 8.

The server processor 34 can include means to transmit information to a remote client computer (e.g. mobile communication device 80), receive a first collection of digital images 5 from the remote client computer mobile communication device 80 through the communication network 18 and store the first collection of received digital images 5 in the electronic storage and retrieval system 16. The server processor 34 further includes means (for example a printer) to form a viewable image 8 that includes a representative image 5a of each digital image 5 in the first collection of digital images 5 in association with a machine-readable code 1, the associated machine-readable code 1 encoding a reference to the location of its associated digital image 5 in the electronic storage and retrieval system 16. The server processor 34 also includes means to receive references or receive photographs of machine-readable codes 1 in the viewable image 8 and extract the references from the received photographs of the machine-readable codes 1 and compile the digital images 5 corresponding to the extracted or received references into the second image collection. Computer system components for storing, communicating, retrieving, and processing digital images are known in the art and discussed in greater detail with respect to FIGS. 15-17 below. In another embodiment, the server processor 34 can include means to display the compiled digital images 5 for viewing on a remote client computer, such as mobile communication device 80.

In yet another embodiment of the present invention, the system further includes means for providing product-specifying machine-readable codes 6 referencing image products 14, each image product 14 incorporating one or more of the digital images 5 in the second image collection, means for providing product-specifying machine-readable codes 6, and means for receiving an image product reference or a photograph of one of the product-specifying machine-readable codes 6 and extracting the image product reference from the received photograph.

In other embodiments, the system includes means for including the product-specifying machine-readable codes 6 in viewable image 8 and for causing the construction of the referenced image product 14.

The image products 14 can include image openings (A, B, C) at specified locations. The system can further include means for locating the selected digital images 5 at the specified locations in accordance with rules. In one example, the rules specify that the order in which the references to the selected digital images 5 or photographs of the corresponding machine-readable codes 1 were received corresponds to an order of the specified locations. In another example, the rules specify that the orientation of the selected digital images corresponds to the aspect ratio of the specified location.

The machine-readable code 1 or 6 can be an optical code, a one-dimensional code, a two-dimensional code, a matrix code, a bar code, or a QR code.

Figure 7:
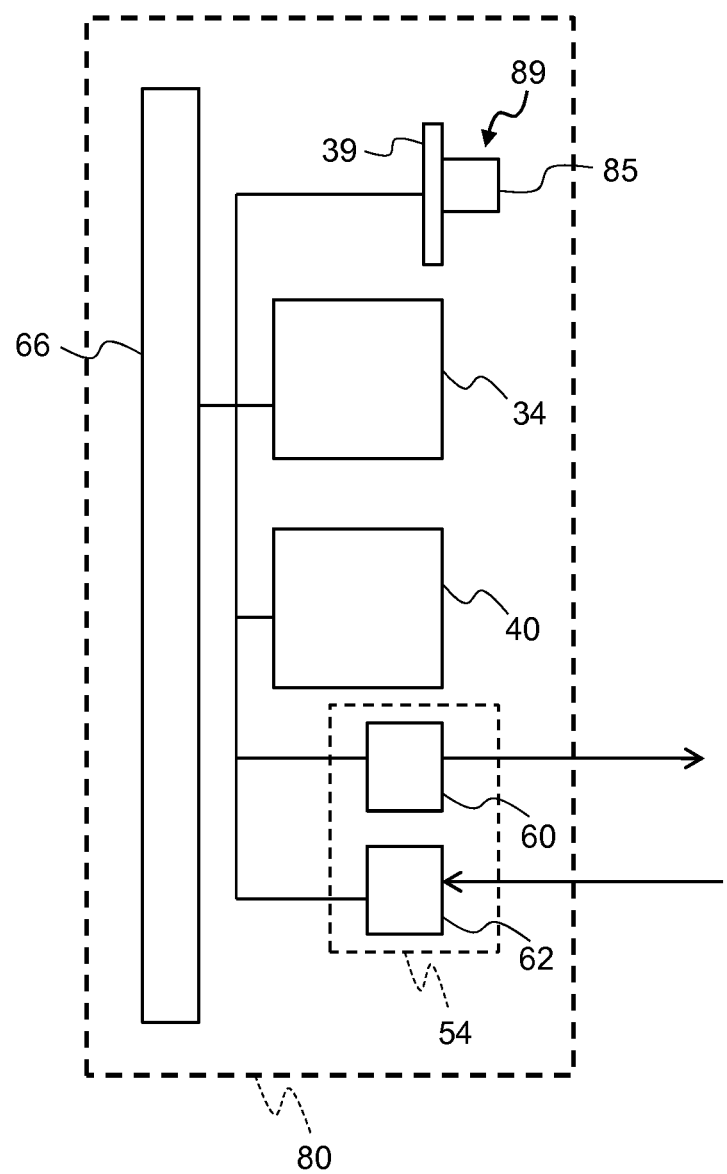
FIG. 7 is a schematic of a mobile communication device useful with the present invention.

Referring in more detail to the mobile communication system 80, as shown in FIG. 7, a mobile communication system 80 useful in various embodiments of the present invention can include a display 66 connected to a processor 34, memory 40, communication system 54 including a transmitter 60 and a receiver 62, and an image sensor 39 with an optical lens system 85 forming a digital camera 89. The processor 34 can execute software stored in the memory 40 to acquire digital images 5 with the digital camera 89, display the digital images 5 on the display 66, store the digital images 5 in the memory 40, or transmit the digital images 5. A digital image 5 can be a scene or an image of a printed or displayed thumbnail image or of a machine-readable code 1 or 6. Such image capture, display, and storage software is known. In one embodiment, the mobile communication system 80 can include software stored in the memory 40 executed by the processor 34 to extract encoded references from photographs of machine-readable codes 1 or 6. Software for forming machine-readable codes 1 or 6 and for extracting references from machine-readable codes 1 or 6 is known. In another embodiment, the mobile communication system 80 does not include such software.

Figure 19:
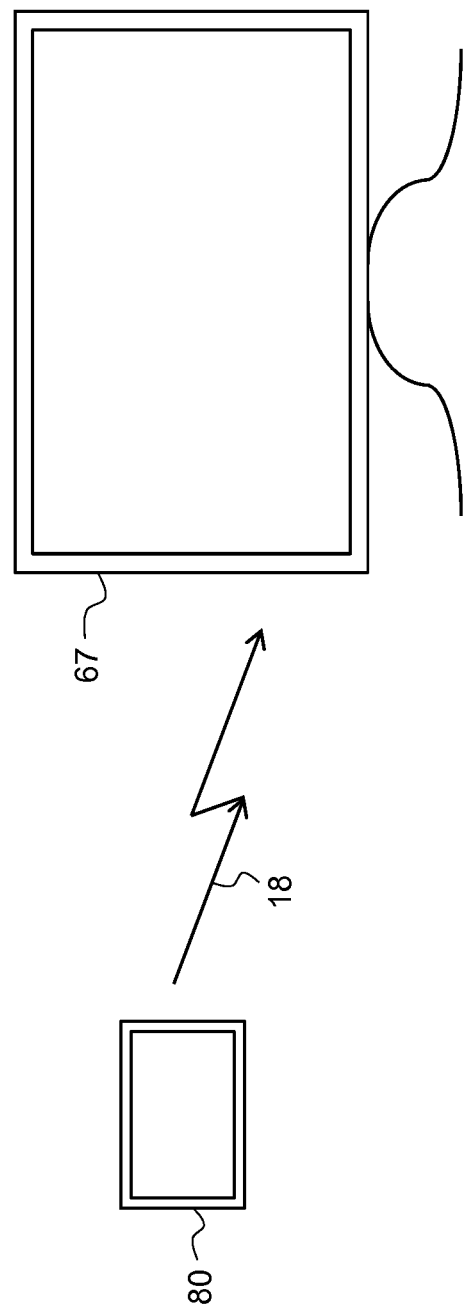
FIG. 19 is an illustration of mobile communication device and external display useful with the present invention.

FIG. 8 is a perspective of a mobile communication system 80a that includes a display 66 together with a local input mechanism 68 such as a local keyboard 68a. Mobile communication system 80b includes a display 66a that incorporates a touch-screen providing local input 68. Both mobile communication devices 80a that include keyboards 68a or mobile communication devices 80b that include displays with touch-screens 66a are known in the art. As shown in FIG. 19, a mobile communication device 80 can communicate through a network 18, either through wireless or wired networks, or through a point-to-point communication device, with a remote display 67 to display images, for example, on a larger display than is present on the mobile communication device itself.

In another embodiment of the present invention, and as illustrated in FIGS. 1, 5, and 6, a viewable image 8 for selecting one or more digital images 5 from a collection of digital images 5 includes a plurality of representative images 5a from the collection of digital images 5, each representative image 5a having a corresponding digital image 5 stored in an electronic storage and retrieval system 16. A machine-readable code 1 is associated with each one of the representative images 5a so that a viewer can readily identify a desired digital image 5 and its associated machine-readable code 1 in the viewable image 8. Each machine-readable code 1 can be photographed to select its corresponding digital image 5. The machine-readable code 1 encodes a reference to the corresponding digital image 5 stored in the electronic storage and retrieval system 16.

Figure 4:
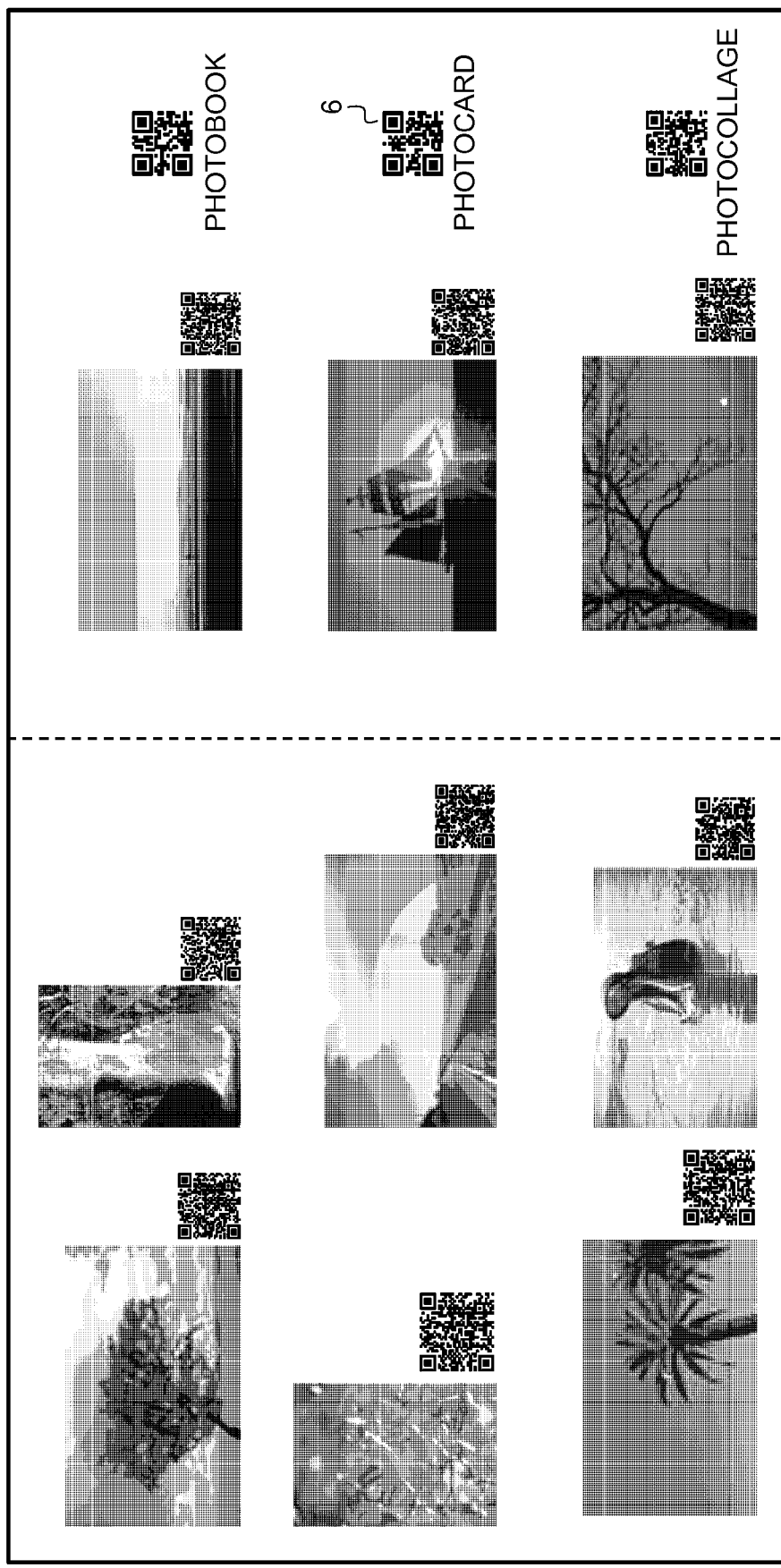
FIG. 4 is an illustration of a viewable image having digital images, machine-readable codes, and image-product codes in a booklet according to an embodiment of the present invention.

In an embodiment of the present invention, the viewable image 8 is an index image printed on a substrate. As shown in FIG. 4, the substrate can be photographic paper and can be a single page or a viewable image booklet 8a having multiple pages with representative images 5a having associated machine-readable codes 1 and optional image-product codes 6. Alternatively, the substrate can be inkjet or electro-photographic paper.

In another embodiment of the present invention, the viewable image 8 is an image displayed on an electronic display.

Figure 3:
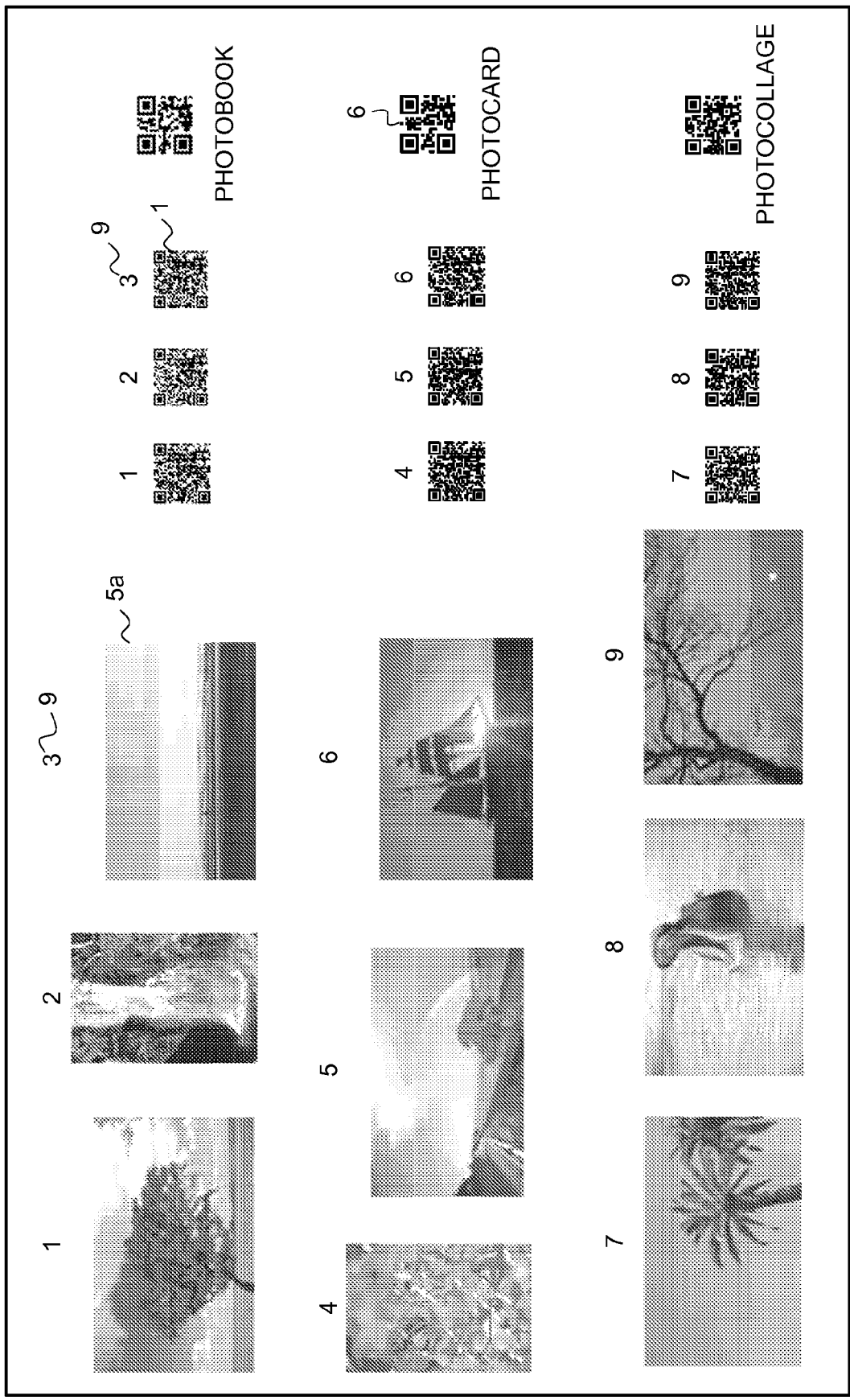
FIG. 3 is an illustration of a viewable image having digital images, machine-readable codes, and image-product codes with alpha-numeric references according to yet another embodiment of the present invention.
Figure 21:
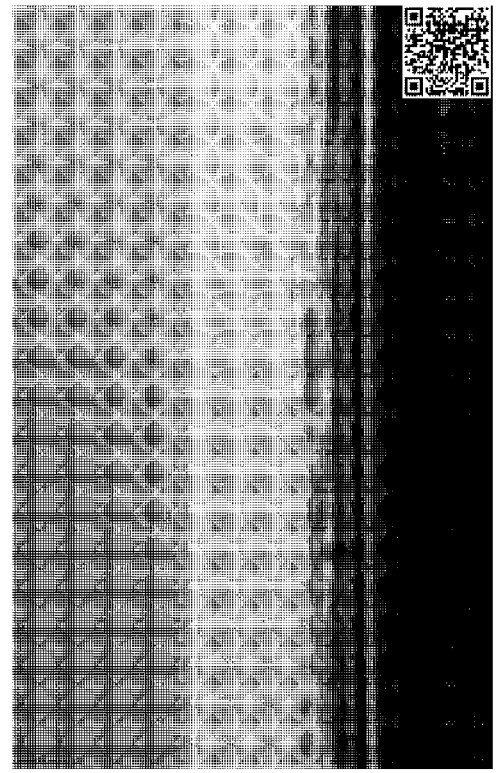
FIG. 21 is an image with an embedded machine-readable code in an embodiment of the present invention.
Figure 20:
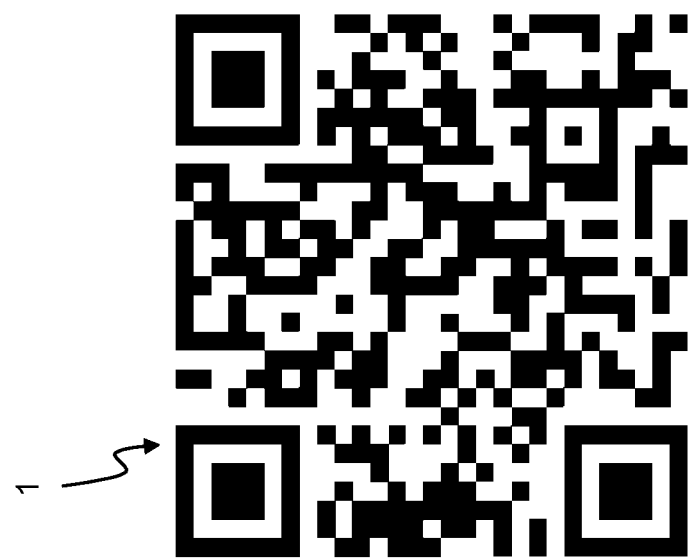
FIG. 20 is a prior-art QR code useful in understanding the present invention.

As shown in FIGS. 1, 2A, 2B, and 4, each representative image 5a in the collection of digital images 5 can be associated with its associated machine-readable code 1 by locating each representative image 5a spatially adjacent to its associated machine-readable code 1 in the viewable image 8. Alternatively, as shown in FIG. 3, each representative image 5a in the collection of digital images can be associated with its associated machine-readable code 1 by providing a common alphanumeric reference 9 to each representative image 5a and its associated machine-readable code 1 in the viewable image 8. In yet another alternative embodiment, illustrated in FIG. 21, each representative image 5a in the collection of digital images is associated with its associated machine-readable code 1 by locating each machine-readable code 1 in or on its associated representative image 5a in the viewable image.

As shown in FIG. 2A, a plurality of product-specifying machine-readable codes 6 can be included in the viewable image 8 so that a viewer can readily identify a desired image product 14 (FIG. 22). The product-specifying machine-readable codes 6 can be photographed to select an image product 14, the image product 14 incorporating one or more of the digital images in the collection. The viewable image 8, as shown in FIG. 2B, can further include information or illustrations 7 of one or more of the image products 14 specified by the viewable product-specifying machine-readable codes 6. The illustrations 7 serve to more clearly indicate to a user what the image product 14 is or the image product appearance, just as the representative image 5a indicates to a user 72 (FIG. 5) the digital image 5 referenced by the associated machine-readable code 1. In a further embodiment, one or more of the digital images 5 in the collection is displayed or illustrated in an illustration 7 of one or more of the image products 14 specified by the product-specifying machine-readable codes 6, thereby illustrating to a user what an image product 14 that included his or her digital images 5 might look like.

In an embodiment of the present invention, the viewable image 8 includes product-specifying machine-readable codes 6 located in an area of the viewable image 8 separated from the plurality of representative images 5a and the plurality of associated machine-readable codes 1, as shown in FIGS. 2A and 2B.

In another embodiment of the present invention, the representative images 5a can have different attributes in the viewable image 8 corresponding to different attributes of the digital images 5. For example, the different attributes can be different sizes, aspect ratios, colors, or cropping parameters. Thus, the representative images 5a in the viewable image 8 can more closely match the digital images 5. While in one embodiment, the digital image 5 is the same as the representative image 5a, in other embodiments the viewable image 8 can have restrictions in format, for example, the viewable image 8 can be limited to black and white images, images of a specific size or aspect ratio, or have a limited range of image sizes so that digital images 5 that are relatively smaller or larger are represented by thumbnail representative images 5a that do not have the same size range.

In an embodiment of the present invention, the viewable image 8 is an index print.

Referring to FIGS. 2A-2B, 5, 6, and 14, a method of the present invention for selecting images from a first collection of digital images to specify a second collection of digital images is illustrated. A client (e.g. a customer) takes pictures (e.g. digital images 5) of scenes using a digital camera (e.g. 89), for example a digital camera included in a mobile communication device 80, in step 300. The client interacts with a server (e.g. a remote website using processors 34 and electronic storage and retrieval systems 16 to provide image-product production services) to transmit the acquired digital images 5 to the server where they are received and stored in an electronic storage and retrieval system 16 (step 400) as a first digital image collection. The server then makes a viewable image 8 in step 405, for example by printing, and communicates the viewable image 8 to the client who receives the viewable image in step 305. A viewable image 8 can be, for example, an index print as described above. The viewable image 8 includes representative images 5a representative of the digital images 5 stored in the electronic storage and retrieval system 16, for example representative images 5a are thumbnail images. The viewable image 8 also includes machine-readable codes 1 associated with the representative images 5a that reference corresponding digital images 5 and, optionally, product-specifying machine-readable codes 6. The products specified by the product-specifying machine-readable codes 6 can include one or more of the digital images 5 stored in the electronic storage and retrieval system 16.

The client then reviews the viewable image 8 and selects desired digital images 5 and image products 14 in step 310, for example by observing the representative images 5a and using the digital camera 89 (FIG. 7) to photograph associated machine-readable codes 1 referencing desired digital images 5 and to photograph a machine-readable code 6 associated with a desired image product. The photographs themselves are digital images but are referred to herein as photographs to avoid confusion with the digital images 5 stored in the electronic storage and retrieval system 16.

The referenced digital images 5 and the optionally selected image product reference are sent to the server in step 315. The references can be sent in at least one of two formats. In one format, the references are extracted from the photographs by the client, e.g. in a client's mobile communication device 80 by using software that extracts encoded information from the photographed machine-readable codes 1 and 6, and then sent. In another format, the photographs themselves are sent to the server and the references extracted by the server. The server receives the references in step 415, accesses the referenced digital images 5 and image product (e.g. from the electronic storage and retrieval system 16) and organizes the selected digital images 5 into the selected image product in step 416.

Figure 18:
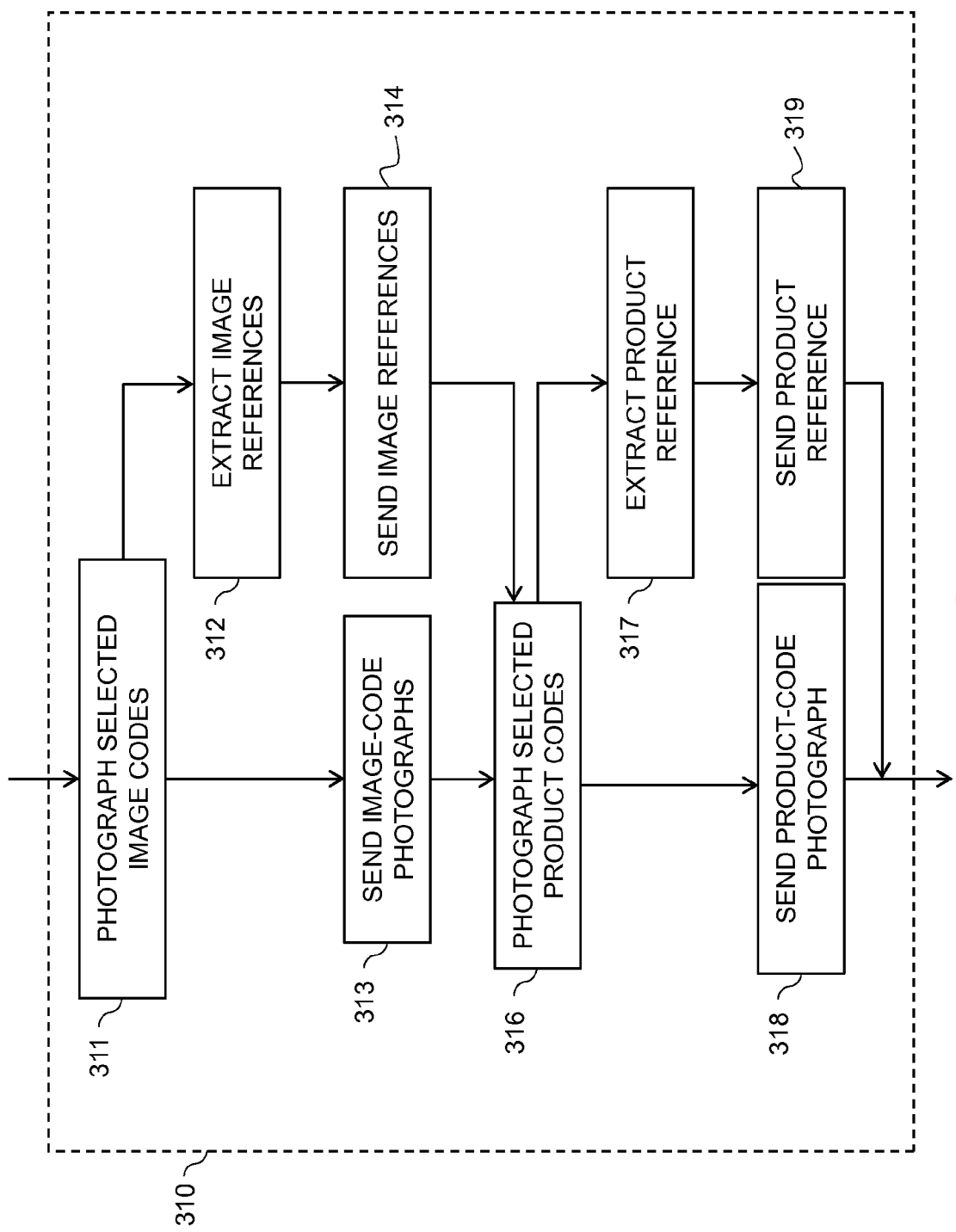
FIG. 18 is a flow diagram illustrating various methods of the present invention.

Referring to FIG. 18, the image and image product selection step 310 is illustrated in more detail. As shown in FIG. 18, a client photographs machine-readable codes 1 associated with the images 5a representing the desired digital images 5 in step 311. Then, either one of two paths is followed. In a first path, the photographs of the image codes are sent to the server (step 313). In a second, alternative path, the image references are extracted from the image-code photographs in step 312 and the image references sent to the server (step 314). These two paths are complementary to step 165 of FIG. 10 that describes the operation of the server system.

A similar process is then repeated for the image product selection. The client photographs the machine-readable code 6 associated with the desired image product 14 in step 316. Then, either one of two paths is followed. In a first path, the photograph of the image-product code is sent to the server (step 318). In a second, alternative path, the product reference is extracted from the product-code photograph in step 317 and the product reference sent to the server (step 319). These two paths are complementary to step 210 of FIG. 12 that describes the operation of the server system.

Referring back to FIG. 14, in a further embodiment of the present invention, the server sends an image product preview, for example, the selected digital images 5, references to the selected digital images, or representative images 5a of the selected digital images 5 (e.g. thumbnails) in step 420. The client receives the preview information and displays the preview in step 320 for example with a processor 34 and local display 66 in a mobile communication device 80. If desired, the image product 14 is ordered in step 325 and the image product 14 is made, or caused to be made, for example, by a third-party manufacturer, in step 425. The image product 14 is then shipped in step 430 and received by the client in step 330.

In a further embodiment of the present invention, the image product 14 includes image openings (A, B, C) at specified locations. The digital camera 89 is used to make a photograph of each of the machine-readable codes 1 associated with selected digital images 5. The image openings (A, B, C) are associated with the selected digital images 5 in accordance with rules. For example, the rules can specify that the order in which the photographs or image references are transmitted corresponds to an order of the image opening locations in the image product. In this case, a client can choose the order in which the machine-readable codes 1 are photographed to control the location of the associated digital images 5 in the image product 14. Alternatively, or in addition, the rules can specify that the orientation of the selected digital images 5 corresponds to the aspect ratio of the specified location in the image product 14.

In another embodiment of the present invention, an apparatus for selecting images from a collection of digital images includes a network-connected mobile communication device 80 including a digital camera 89 for acquiring digital images, a processor 34, and a storage device (e.g. memory 40), the storage device having a stored program executable by the processor, e.g. as illustrated in FIG. 7. The mobile communication device 80 is also an imaging device. The mobile communication device 80 can be adapted to photograph a selection of machine-readable codes 1 referencing desired images 5 in a viewable image 8 that includes images 5a representative of the digital images 5 in the collection of digital images in association with a machine-readable code 1. The machine-readable code 1 encodes a reference to the location of the associated digital image 5 in an electronic storage and retrieval system 16. The mobile imaging device 80 is also adapted to transmit the photographs to a remote image-product production facility or extract the references from the photographs and transmit the references to the remote image-product production service. Mobile imaging devices incorporating digital cameras for making photographs and software for executing on a processor to extract encoded information in the machine-readable codes are known in the art.

The mobile imaging device 80 can further include a receiver for receiving referenced digital images 5, references to the digital images 5, or representative images 5a of the referenced digital images 5 and memory storage for storing the received referenced or representative digital images 5*a*. The mobile imaging device 80 can include a local display 66 and can be adapted to display the referenced or representative digital images 5*a* on the local display 66. The mobile imaging device 80 can be adapted to photograph a product-specifying machine-readable code 6 referencing an image product and transmit the photograph to a remote image-product production service.

In various embodiments of the present invention, the network 18 is the Internet and the viewable image 8 is printed.

In a further embodiment of the present invention, the machine-readable code 1, 6 is an optical code and an image sensor (e.g. a linear sensor or area sensor) is used to scan the machine-readable optical code 1 to produce a photograph of the machine-readable optical code 1, 6 and a processor 34 is used to decode encoded information in the photograph. The decoded information can be a URI and the processor 34 used to display information associated with the URI, for example in a web page on a local display 66.

Figure 15:
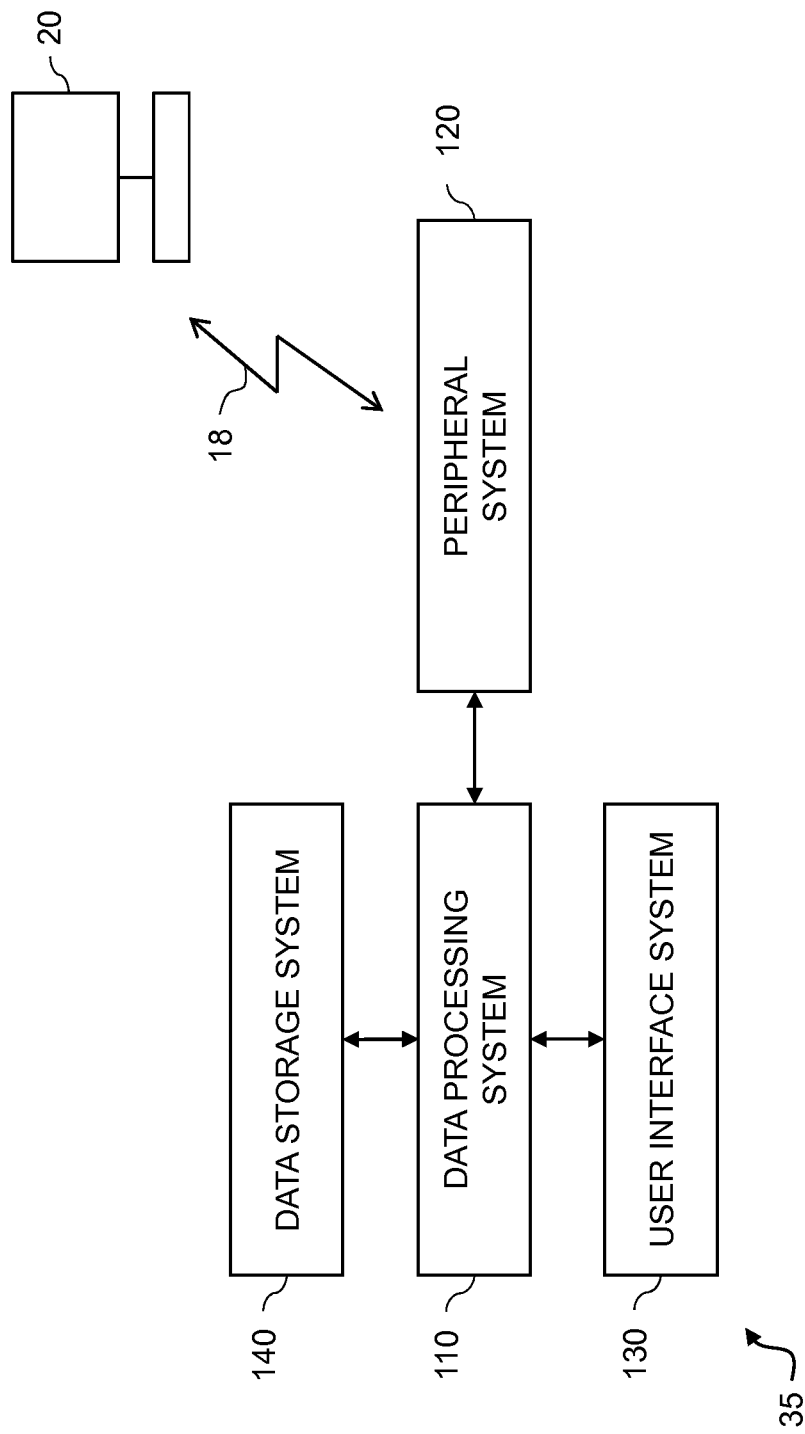
FIG. 15 is a schematic of a system useful in various embodiments of the present invention.

FIG. 15 is a high-level diagram showing the components of a system 35 useful for various embodiments of the present invention. The system 35 includes a data processing system 110, a peripheral system 120, a user interface system 130, and a data storage system 140. The peripheral system 120, the user interface system 130 and the data storage system 140 are communicatively connected to the data processing system 110.

The data processing system 110 includes one or more data processing devices that implement the processes of the various embodiments of the present invention, including the example processes described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, a digital picture frame, cellular phone, a smart phone or any other device for processing data, managing data, communicating data, or handling data, whether implemented with electrical, magnetic, optical, biological components, or otherwise.

The data storage system 140 includes one or more processor-accessible memories configured to store information, including the information needed to execute the processes of the various embodiments of the present invention, including the example processes described herein. The data storage system 140 can be a distributed processor-accessible memory system including multiple processor-accessible memories communicatively connected to the data processing system 110 via a plurality of computers or devices. On the other hand, the data storage system 140 need not be a distributed processor-accessible memory system and, consequently, can include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, caches, floppy disks, hard disks, Compact Discs, DVDs, flash memories, ROMs, and RAMs.

The phrase "communicatively connected" is intended to include any type of connection, whether wired or wireless, between devices, data processors, or programs in which data is communicated. The phrase "communicatively connected" is intended to include a connection between devices or programs within a single data processor, a connection between devices or programs located in different data processors, and a connection between devices not located in data processors at all. In this regard, although the data storage system 140 is shown separately from the data processing system 110, one skilled in the art will appreciate that the data storage system 140 can be stored completely or partially within the data processing system 110. Further in this regard, although the peripheral system 120 and the user interface system 130 are shown separately from the data processing system 110, one skilled in the art will appreciate that one or both of such systems can be stored completely or partially within the data processing system 110.

The peripheral system 120 can include one or more devices configured to provide digital content records to the data processing system 110. For example, the peripheral system 120 can include digital still cameras, digital video cameras, cellular phones, smart phones, or other data processors. The data processing system 110, upon receipt of digital content records from a device in the peripheral system 120, can store such digital content records in the data storage system 140. The peripheral system 120 can be connected through a communication channel 18 (e.g. the internet or cell-phone networks) to other computer systems 20.

The user interface system 130 can include a mouse, a keyboard, another computer, or any device or combination of devices from which data is input to the data processing system 110. In this regard, although the peripheral system 120 is shown separately from the user interface system 130, the peripheral system 120 can be included as part of the user interface system 130.

The user interface system 130 also can include a display device, a processor-accessible memory, or any device or combination of devices to which data is output by the data processing system 110. In this regard, if the user interface system 130 includes a processor-accessible memory, such memory can be part of the data storage system 140 even though the user interface system 130 and the data storage system 140 are shown separately in FIG. 15.

As shown in FIG. 16 in more detail, a computer system according to various embodiments of the present invention includes an electronic computer system 20, for example a computer server, connected to a remote electronic computer system 35, for example a remote client computer, through a computer network, the electronic computer system 20 including memory 40 for storing one or more digital image files communicated through the computer network to the remote electronic computer system 35, the remote electronic computer system 35 having the local display 66 for displaying the digital image files 10 in a graphic user interface.

In the embodiment of FIG. 16, the electronic computer system 20 includes a source of content data files 24, a user input system 26 and an output system 28 connected to the processor 34. The source of content data files 24, user-input system 26 or output system 28, and processor 34 are positioned within a housing 22 as illustrated. In other embodiments, circuits and systems of the source of content data files 24, user input system 26 or output system 28 are positioned in whole or in part outside of housing 22.

The source of content data files 24 can include any form of electronic or other circuit or system that can supply digital data to processor 34 from which processor 34 can derive images for use in forming a digital image file. In this regard, the content data files can include, for example and without limitation, still images, image sequences, video graphics, and computer-generated images. Source of content data files 24 can optionally capture images to create content data for use in content data files by use of capture devices located at, or connected to, electronic computer system 20 or can obtain content data files that have been prepared by or using other devices such as the remote electronic computer system 35. In the embodiment of FIG. 16, source of content data files 24 includes sensors 38, the memory 40 and a communication system 54.

Sensors 38 are optional and can include light sensors, biometric sensors and other sensors known in the art that can be used to detect conditions in the environment of electronic computer system 20 and to convert this information into a form used by processor 34 of electronic computer system 20. Sensors 38 can also include one or more image sensors 39 that are adapted to capture still or video images. Sensors 38 can also include biometric or other sensors for measuring involuntary physical and mental reactions such sensors including, but not limited to, voice inflection, body movement, eye movement, pupil dilation, body temperature, and p4000 wave sensors.

Memory 40 can include conventional memory devices including solid-state, magnetic, optical or other data-storage devices. Memory 40 can be fixed within electronic computer system 20 or it can be removable. In the embodiment of FIG. 16, electronic computer system 20 is shown having a hard drive 42, a disk drive 44 for a removable disk such as an optical, magnetic or other disk memory (not shown) and a memory card slot 46 that holds a removable memory 48 such as a removable memory card and has a removable memory interface 50 for communicating with removable memory 48. Data including, but not limited to, control programs, digital images and metadata can also be stored in a remote memory system 52 such as the remote electronic computer system 35, a personal computer, computer network or other digital system. Remote memory system 52 can also include solid-state, magnetic, optical or other data-storage devices.

In the embodiment shown in FIG. 16, electronic computer system 20 has the communication system 54 that in this embodiment is used to communicate with remote electronic computer systems 35 for example including an optional remote memory system 52, an optional remote display 56, or optional remote input 58 (also referred to herein as "remote input 58"). The optional remote memory system 52, optional remote display 56, and optional remote input 58 can all be part of the remote electronic computer system 35 having the remote input 58 with remote input controls, and that can communicate with communication system 54 wirelessly as illustrated or can communicate in a wired fashion. In an alternative embodiment, a local input station including either or both of the local display 66 and local input controls 68 (also referred to herein as "local user input 68") are connected to communication system 54 using a wired or wireless connection.

Communication system 54 can include for example, one or more optical, radio frequency or other transducer circuits or other systems that convert image and other data into a form that is conveyed to a remote device such as the remote memory system 52 or the remote display 56 using an optical signal, radio frequency signal or other form of signal. Communication system 54 can also be used to receive a digital image and other data from a host or server computer or network (not shown), the remote memory system 52 or the remote input 58. Communication system 54 provides processor 34 with information and instructions from signals received thereby. Typically, communication system 54 will be adapted to communicate with the remote memory system 52 by way of a communication network such as a conventional telecommunication or data transfer network such as the internet, a cellular, peer-to-peer or other form of mobile telecommunication network, a local communication network such as wired or wireless local area network or any other conventional wired or wireless data transfer system. In one useful embodiment, the electronic computer system 20 can provide web access services to remote electronic computer systems 35 that access the electronic computer system 20 through a web browser. Alternatively, the remote electronic computer system 35 can provide web services to electronic computer system 20 depending on the configurations of the systems.

User input system 26 provides a way for a user 72 (FIG. 17) of electronic computer system 20 to provide instructions to processor 34. This permits the user 72 to make a designation of content data files to be used in generating a digital image file and to select an output form for an output product or print. User input system 26 can also be used for a variety of other purposes including, but not limited to, permitting the user 72 to arrange, organize and edit content data files to be incorporated into the image-enhanced output product, to provide information about the user or audience, to provide annotation data such as voice and text data, to identify characters in the content data files, and to perform such other interactions with electronic computer system 20 as are described herein.

In this regard user input system 26 can include any form of transducer or other device capable of receiving an input from the user 72 and converting this input into a form used by processor 34. For example, user input system 26 can include a touch screen input, a touch pad input, a 4-way switch, a 6-way switch, an 8-way switch, a stylus system, a trackball system, a joystick system, a voice recognition system, a gesture recognition system a keyboard, a remote control or other such systems. In the embodiment shown in FIG. 16, user input system 26 includes an optional remote input 58 including a remote keyboard 58a, a remote mouse 58b, and a remote control 58c and a local user input 68 including a local keyboard 68a and a local mouse 68b.

Remote input 58 can take a variety of forms, including, but not limited to, the remote keyboard 58a, remote mouse 58b or remote control handheld device 58c illustrated in FIG. 16. Similarly, local user input 68 can take a variety of forms. In the embodiment of FIG. 16, local display 66 and local user input 68 are shown directly connected to processor 34.

As is illustrated in FIG. 17 local user input 68 can take the form of an editing area 70 such as a home computer, an editing studio, or kiosk that can also be the remote electronic computer system 35. In this illustration, the user 72 is seated before a console including local keyboard 68a and mouse 68b and a local display 66 which is capable, for example, of displaying multimedia content, for example in a graphic user interface. As is also illustrated in FIG. 17, editing area 70 can also have sensors 38 including, but not limited to, image sensors 39, audio sensors 74 and other sensors such as multispectral sensors that can monitor user 72 during a production session or provide other information such as images.

Output system 28 (FIG. 16) is used for rendering images, text or other graphical representations in a manner that permits printing image, text, or other graphical representations. In this regard, output system 28 can include any conventional structure or system that is known for printing or recording images on output device 32 including, but not limited to, printer 29. Printer 29 can record images on a tangible surface 30 using a variety of known technologies including, but not limited to, conventional four-color offset separation printing or other contact printing, silk screening, dry electrophotography such as is used in the NexPress 2100 printer sold by Eastman Kodak Company, Rochester, N.Y., USA, thermal printing technology, drop-on-demand inkjet technology and continuous inkjet technology. For the purpose of the following discussions, printer 29 will be described as being of a type that generates color images. However, it will be appreciated that this is not needed and that the claimed methods and apparatuses herein can be practiced with the printer 29 that prints monotone images such as black and white, grayscale, or sepia-toned images. As will be readily understood by those skilled in the art, the electronic computer system 20 can be separated from the remote electronic computer system 35 connected to the printer 29.

In certain embodiments, the source of content data files 24, user input system 26 and output system 28 can share components.

Processor 34 operates electronic computer system 20 based upon signals from user input system 26, sensors 38, memory 40 and communication system 54. Processor 34 can include, but is not limited to, a programmable digital computer, a programmable microprocessor, a programmable logic processor, a series of electronic circuits, a series of electronic circuits reduced to the form of an integrated circuit, or a series of discrete components.

In an embodiment of the present invention illustrated in FIGS. 7 and 8, the remote electronic computer system 35 is a mobile communication device 80, for example a cellular telephone, a smart phone, or a wirelessly connected hand-held computer such as a tablet computer. The mobile communication device 80 can include the local display 66 or the user-input system incorporating the local input 68 keyboard 68*a*. In another embodiment, a local input 68 device is a touch screen. The mobile communication device 80 can communicate with electronic computer system 20 directly, for example through a wireless local area network or a point-to-point wireless connection, or indirectly through a cellular telephony network. The electronic computer system 20 can be a computer server, for example providing browser-based web pages to a remote electronic computer system 35, 80 through the internet.

Any of the electronic computer system 20, remote electronic computer system 35, or the mobile communication device 80 can execute software programs on the internal processor 110, 34. The software programs can interact with the user 72 through a user interface (e.g. local display 66 and local input 68) or with remote computers to accomplish the programmed task. The software programs can execute algorithms to analyze data (e.g. digital image files) or to compute useful values. A computer software program product can include one or more non-transitory, tangible, computer readable storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The present invention provides advantages over the prior art for selecting digital images from a large collection of digital images. Representations of the digital images can be provided on a printed index print or on a display. Mobile communication devices with image acquisition capability and small display screens can be used advantageously to efficiently and easily select elements from printed media to form a collection of selected elements that are stored in an electronic storage and retrieval system.

In contrast, methods known in the art require the physical delivery of physically marked media. This method is slow, tedious, prone to error, and can require additional tools such as image scanners. Other methods require data entry, for example using a keyboard or touch screen, that are also tedious, slow, and error prone.

The invention has been described in detail with particular reference to certain embodiments thereof, but it will be understood that variations and modifications can be effected within the spirit and scope of the invention.

PARTS LIST

A, B, C image openings
1 image machine-readable code
5 digital image
5*a* representative images/digital image thumbnail
6 image product machine-readable code
7 illustrations
8 viewable image
8*a* viewable image booklet
9 alphanumeric reference
14 image product
16 electronic storage and retrieval system
18 communication channel or network
20 electronic computer system
22 housing
24 source of content data files
26 user input system
28 output system
29 printer
30 tangible surface
32 output device
34 processor
35 remote electronic computer system
38 sensors
39 image sensors
40 memory
42 hard drive
44 disk drive
46 memory card slot
48 removable memory
50 memory interface
52 remote memory system
54 communication system
56 remote display
58 remote input
58*a* remote keyboard
58*b* remote mouse
58*c* remote control
60 transmitter
62 receiver
66 local display
66*a* local display with touch screen
67 display
68 local input
68*a* local keyboard
68*b* local mouse
70 editing area (home computer, editing studio, or kiosk)
72 user
74 audio sensors
80, 80*a*, 80*b* mobile communication device, remote client computer
85 optical lens system
89 digital camera
110 data processing system
120 peripheral system
130 user interface system
140 data storage system
150 store digital image collection step
155 form image code references step 160 provide viewable image step
161 incorporate image-code references step
165 receive digital image references step
166 receive references step
167 receive code images step
168 extract references step
170 compile referenced images step
175 display compiled images
195 receive and store images step
199 provide image-product rules step
200 provide image-product codes step
205 provide viewable images of image-product codes step
206 locate image code adjacent product code step
208 incorporate image-product codes step
210 obtain image-product references step
211 receive image-product references step
212 receive photograph of image-product code step
213 extract image-product reference step
215 construct referenced image product step
216 access image product step
217 access images step
218 incorporate images according to rules step
219 print image product step
300 take pictures step
305 receive viewable image step
310 select images and product step
311 photograph selected image codes step
312 extract image references step
313 send image-code photographs step
314 send image references step
315 send selected references to website step
316 photograph image-product code step
317 extract product reference step
318 send product-code photograph step
319 send product reference step
320 display preview step
325 order product step
330 receive product step
400 receive and store pictures step
405 make viewable image step
415 receive selected images and product step
416 organize images in product
420 send preview step
425 make product step
430 ship image product step

The invention claimed is:

1. A system configured to enable selection of one or more digital images from a collection of digital images, the system comprising:
a plurality of representative images representing corresponding digital images in the collection, wherein each corresponding digital image is stored at a storage location in an electronic storage and retrieval system;
a plurality of machine-readable codes, wherein each machine-readable code is associated with one of the representative images so that a viewer can readily identify a desired digital image and a corresponding machine-readable code in the system, wherein:
each machine-readable code is photographed to select its corresponding digital image; and
the machine-readable code encodes an address reference to the address of the storage location of the corresponding digital image in the electronic storage and retrieval system; and
a plurality of product-specifying machine-readable codes, wherein each product-specifying machine code is associated with an image product to enable a viewer to readily identify a desired image product which incorporates one or more of the digital images in the collection, and wherein each product-specifying machine-readable code is photographed to select its corresponding image product.

2. The system of claim 1, wherein the system is an image printed on a substrate.

3. The system of claim 2, wherein the substrate is photographic paper.

4. The system of claim 2, wherein the substrate is a single page.

5. The system of claim 2, wherein the substrate is a booklet having multiple pages.

6. The system of claim 2, wherein the substrate is inkjet or electro-photographic paper.

7. The system of claim 1, wherein the system is an image displayed on an electronic display.

8. The image system of claim 1, wherein the machine-readable code is an optical code, a one-dimensional code, a two-dimensional code, a matrix code, a bar code, or a QR code.

9. The system of claim 1, wherein each representative image is associated with its associated machine-readable code by locating each representative image spatially adjacent to its associated machine-readable code in the system.

10. The system of claim 1, wherein each representative image is associated with its associated machine-readable code by providing a common alphanumeric reference to each representative image and its associated machine-readable code in the system.

11. The system of claim 1, wherein each representative image is associated with its associated machine-readable code by locating each machine-readable code in or on its associated representative image in the system.

12. The system of claim 1, further including information or illustrations of one or more of the image products specified by the viewable product-specifying machine-readable codes.

13. The system of claim 12, wherein one or more of the digital images in the collection is displayed or illustrated in an illustration of one or more of the image products specified by the product-specifying machine-readable codes.

14. The system of claim 1, wherein the product-specifying machine-readable codes are located in an area of the system separated from the plurality of representative images and the plurality of machine-readable codes.

15. The system of claim 1, wherein the representative images have different attributes in the viewable image corresponding to different attributes of the digital images.

16. The system of claim 15, wherein the different attributes are different sizes, aspect ratios, color, or cropping parameters.

17. The system of claim 1, wherein the system is an index print.

18. The system of claim 1, wherein the image product is a photo-book, a photo-card, or a photo collage.

19. The system of claim 1, wherein the image product is electronic, printed, or a combination of electronic and printed.

20. The system of claim 1, wherein the image product is constructed in accordance with rules.

* * * * *

UNITED STATES PATENT AND TRADEMARK OFFICE
CERTIFICATE OF CORRECTION

PATENT NO. : 8,596,523 B2  
APPLICATION NO. : 13/192514  
DATED : December 3, 2013  
INVENTOR(S) : Murray et al.

It is certified that error appears in the above-identified patent and that said Letters Patent is hereby corrected as shown below:

In the Specification

In Column 1, Line 47, delete "interne" and insert -- internet --, therefor.

In Column 19, Line 45, delete "step" and insert -- step. --, therefor.

In the Claims

In Column 20, Line 21, in Claim 8, delete "image system" and insert -- system --, therefor.

Signed and Sealed this
Sixth Day of May, 2014

Michelle K. Lee
*Deputy Director of the United States Patent and Trademark Office*